United States Patent [19]

Kato

[11] Patent Number: 5,999,514
[45] Date of Patent: Dec. 7, 1999

[54] VIRTUAL CONNECTION ON ESTABLISHMENT CONTROLLING APPARATUS IN A CELL SWITCHING SYSTEM AND SUBSCRIBER SERVICE PROVIDING METHOD, FOR USE IN A CELL SWITCHING SYSTEM

[75] Inventor: Masaaki Kato, Kanagawa, Japan

[73] Assignee: Fujitsu Limited, Kanagawa, Japan

[21] Appl. No.: 08/831,240

[22] Filed: Apr. 2, 1997

[30] Foreign Application Priority Data

Oct. 3, 1996 [JP] Japan .................................... 8-262630

[51] Int. Cl.⁶ ............................ H04L 12/28; H04L 12/56
[52] U.S. Cl. .......................................... 370/231; 370/399
[58] Field of Search .................................... 370/395, 397,
370/230, 232, 233, 234, 231, 235, 236,
398, 399, 409, 422

[56] References Cited

U.S. PATENT DOCUMENTS 5,572,523 11/1996 Katsube e tal. ......................... 370/231
5,719,854 2/1998 Choudhury et al. .................... 370/231
5,768,271 6/1998 Seid et al. ............................... 370/389
5,818,815 10/1998 Carpentier et al. ..................... 370/218

FOREIGN PATENT DOCUMENTS 4-109730 4/1992 Japan .

*Primary Examiner*—Alpus H. Hsu
*Assistant Examiner*—Mitchell Slavitt
*Attorney, Agent, or Firm*—Helfgott & Karas, PC.

[57] ABSTRACT

A unique VPCI is defined for each of subscriber lines #A and #B, which are accommodated in an ATM switch. Conventionally, attribute data indicating subscriber attributes can be defined only for each of the subscriber line units #A and #B as a unit. However, the attribute data can be defined for each virtual path whose VPCI is used as the unit according to the present invention. Accordingly, it can easily be implemented, for example, to make different communication forms for each of different subscriber accommodation location numbers belonging to the same subscriber.

39 Claims, 19 Drawing Sheets

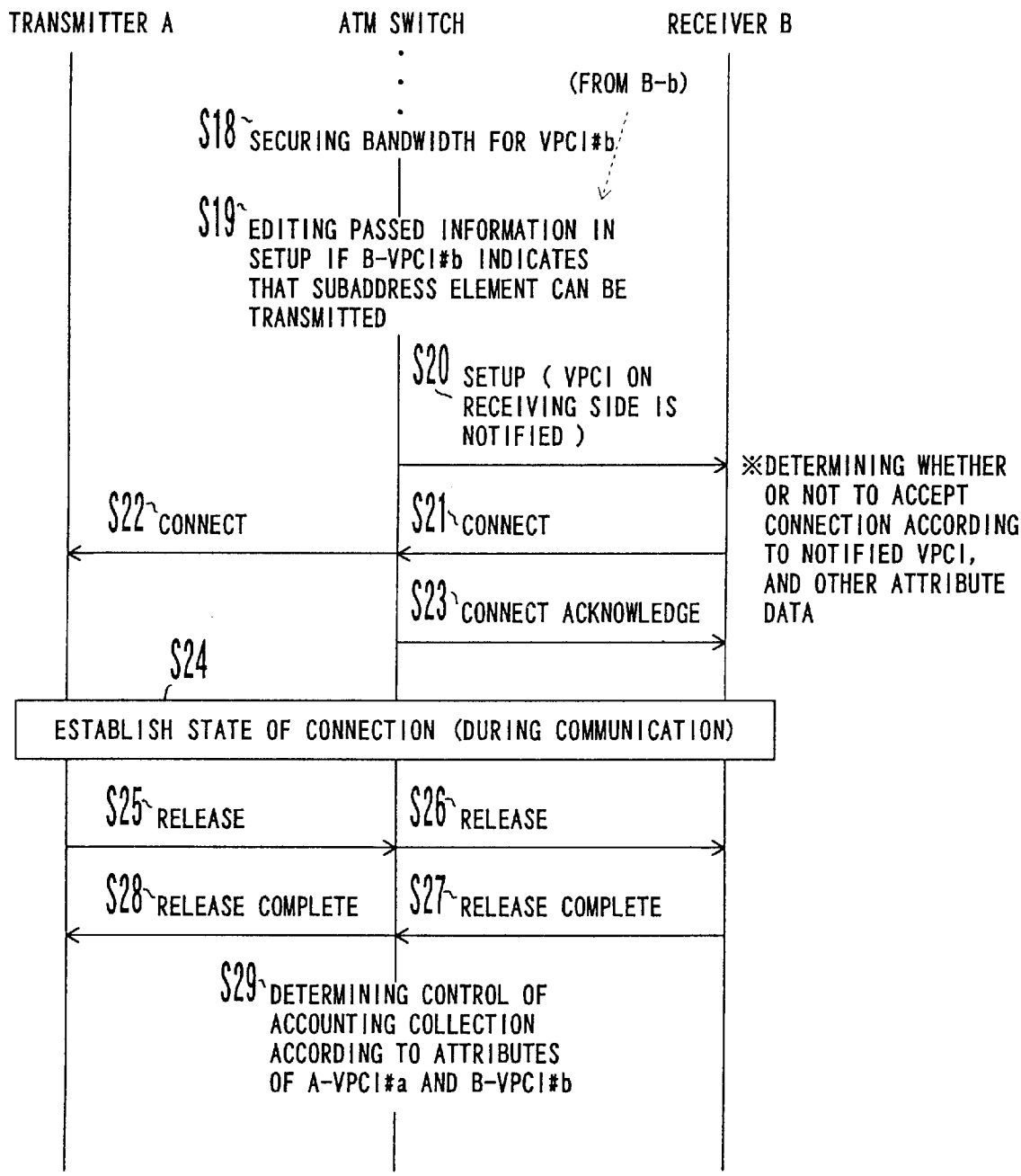
F I G. 3

(a) PATH CONNECTION FORM
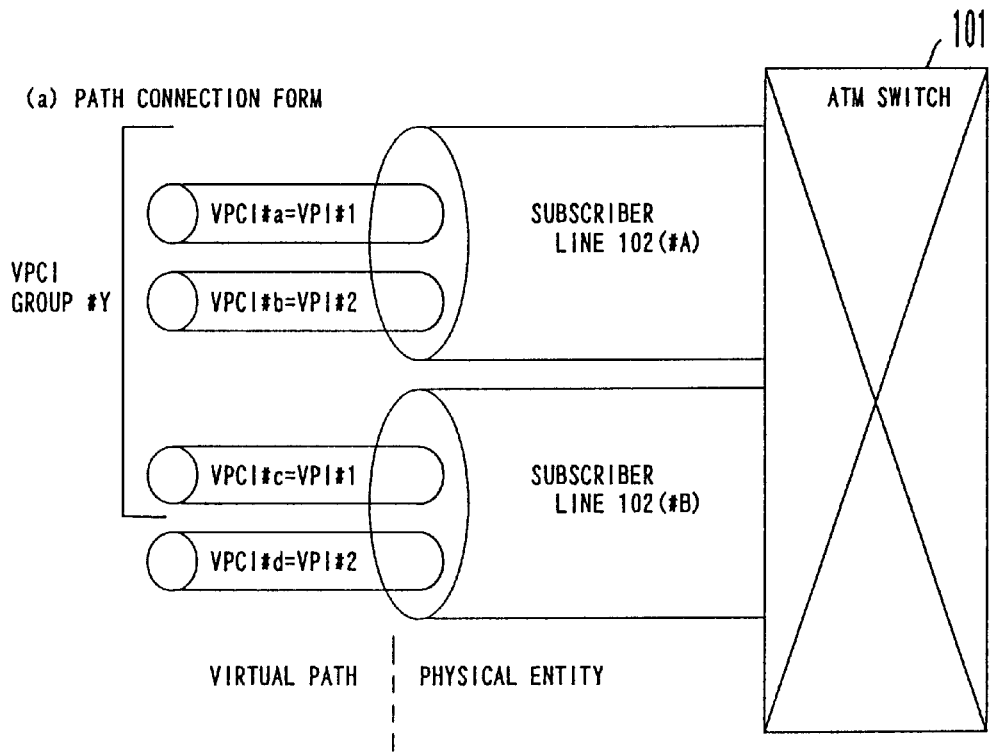
(b) SUBSCRIBER ATTRIBUTE DEFINITION ACCORDING TO THIS EMBODIMENT
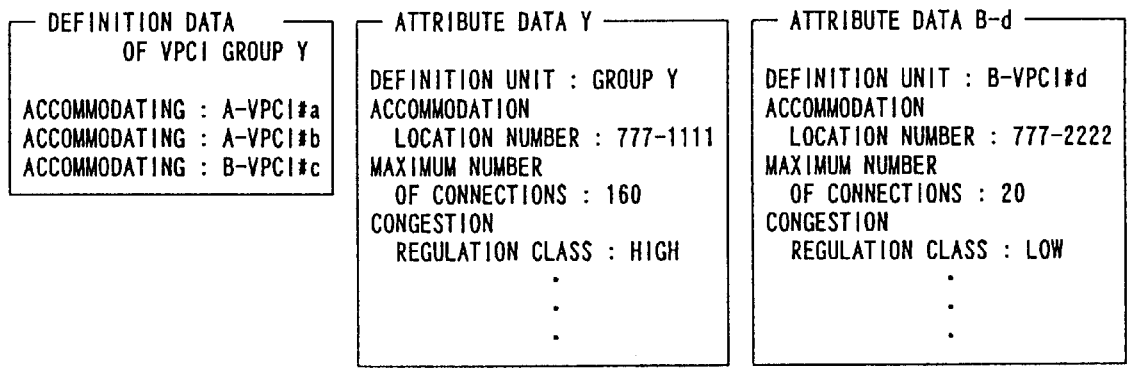
FIG. 5

(a) PATH CONNECTION FORM
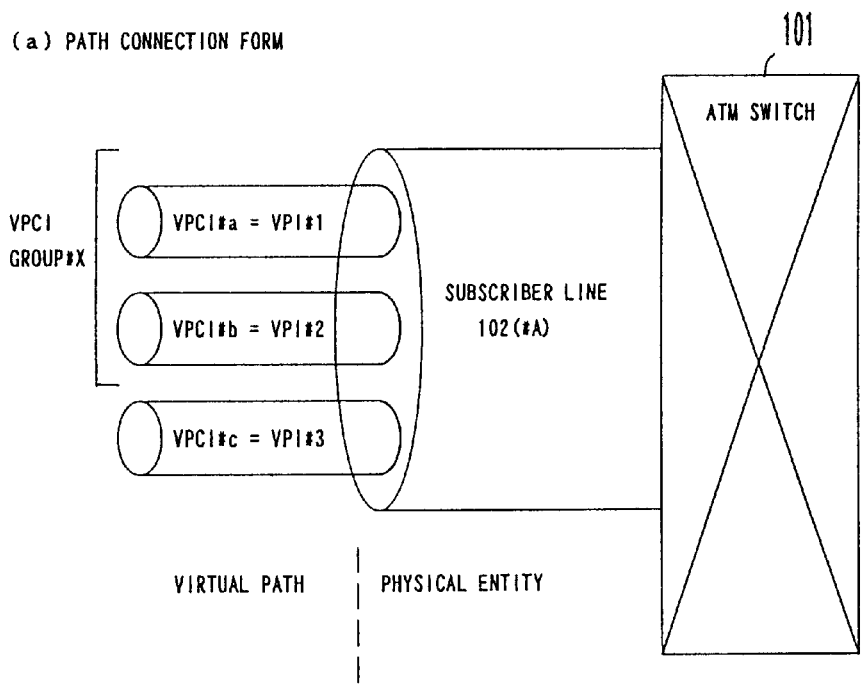
(b) SUBSCRIBER ATTRIBUTE DEFINITION ACCORDING TO THIS EMBODIMENT
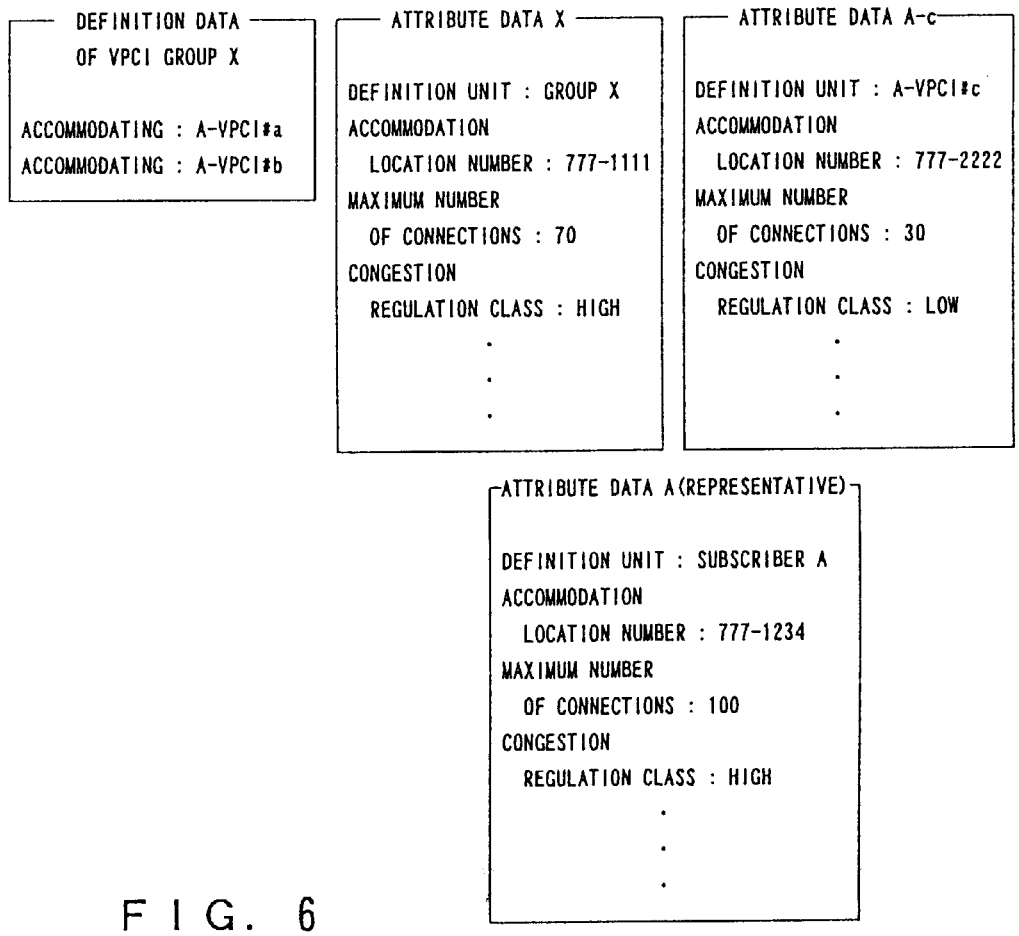
FIG. 6

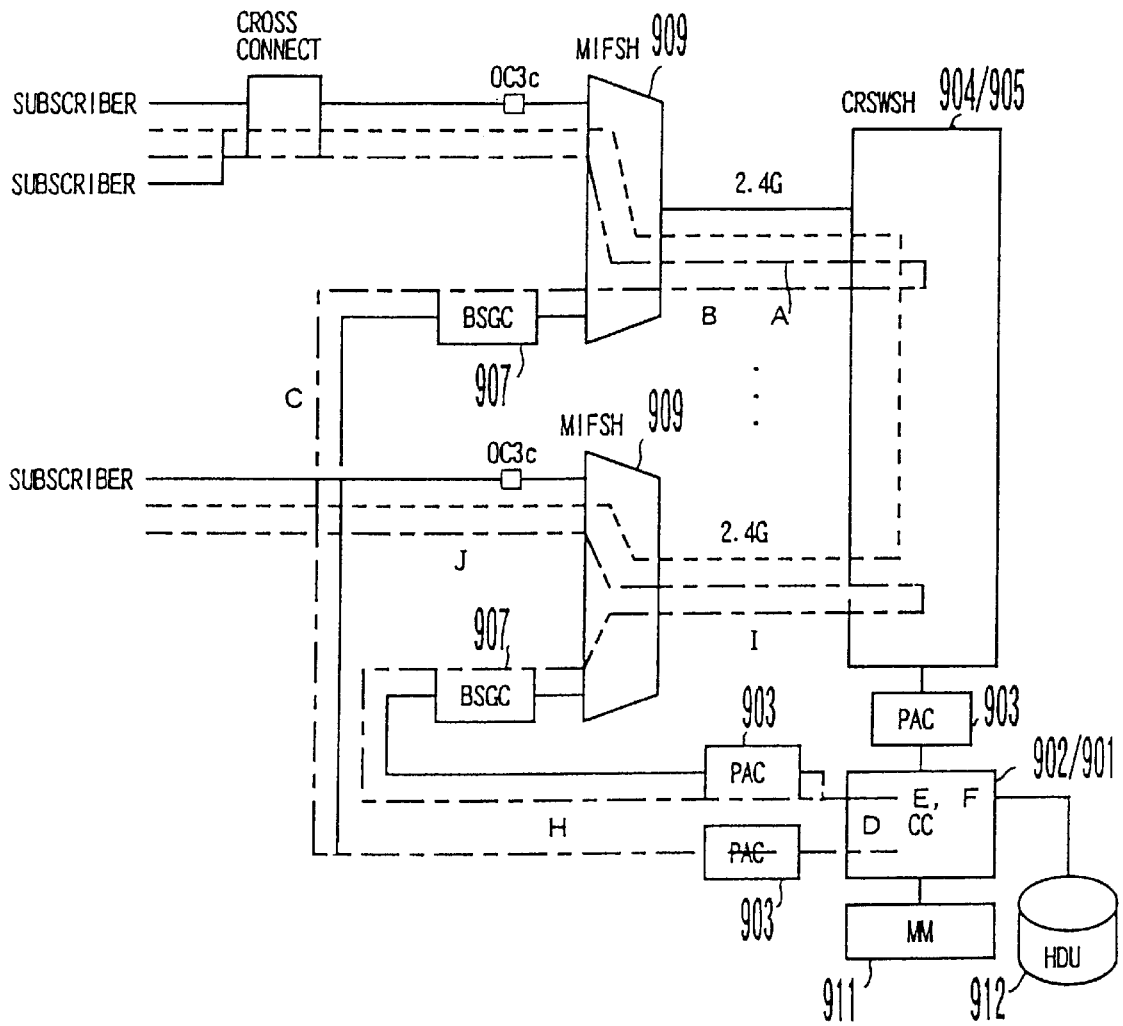

CRSWSH (Cell Relay Switch Shelf) : ATM SWITCHING UNIT
MIFSH (Middle Interface Shelf) : MIDDLE-SPEED INTERFACE MULTIPLEXING UNIT
OC3c (Optical Carrier 3 Concatenated) : Sonet INTERFACE AT 155Mbps
BSGC : Broadband Signaling Controller
CC (Central Controller) : CENTRAL CONTROLLER
MM (Main Memory) : MAIN MEMORY
PAC (Processor Access Controller) : CONTROLLER BETWEEN PROCESSORS
HDU : HARD DISK UNIT
CROSS CONNECT : UNIT FOR MULTIPLEXING VIRTUAL PATH LINKS
‒ ‒ ‒ ‒ ‒ : CONNECTION PATH (THROUGH WHICH USER CELLS ARE TRANSMITTED) BETWEEN SUBSCRIBERS
— · · — : SVU Signalling PATH

FIG. 11

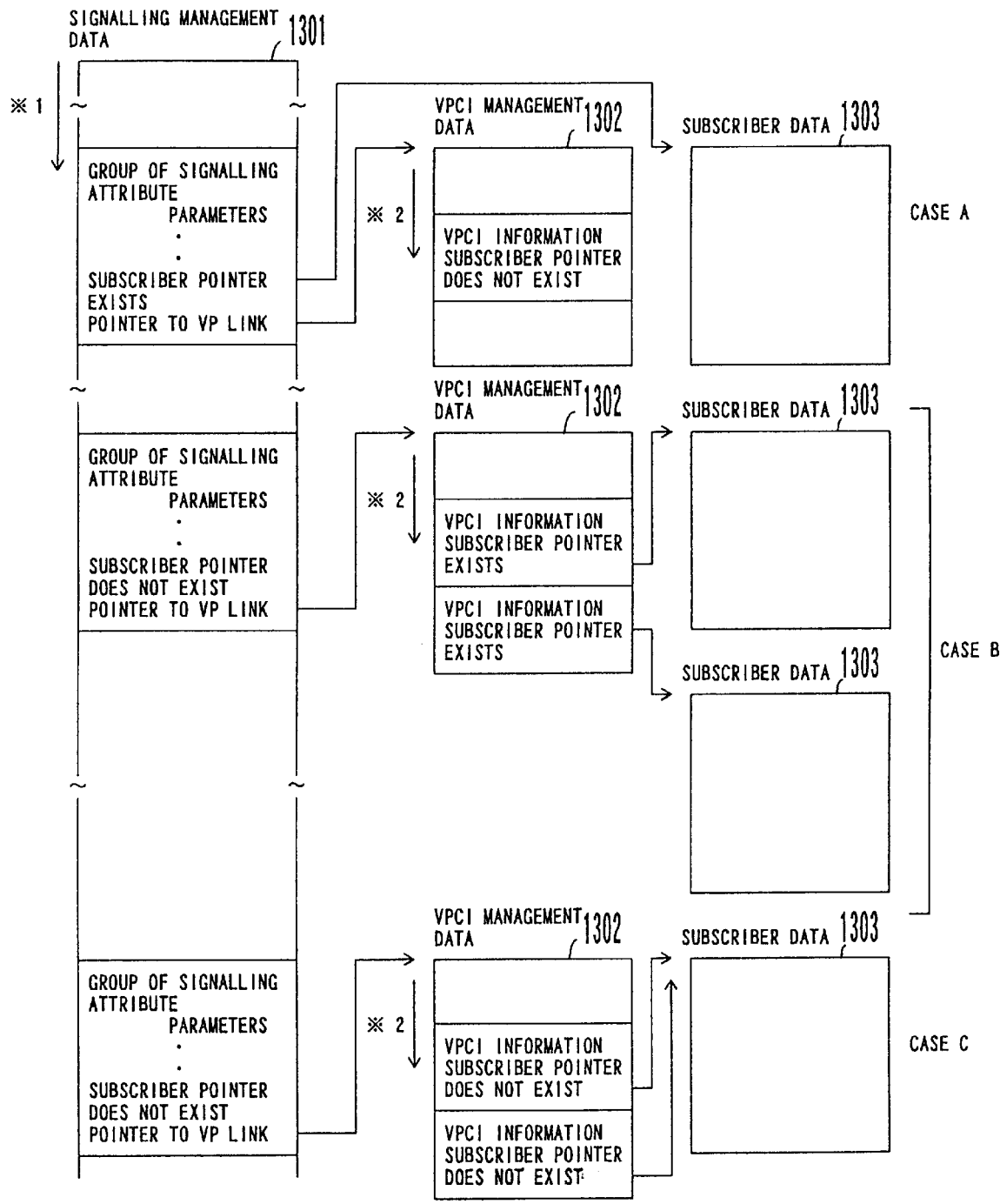
F I G. 1 3

| | |
|---|---|
| CALL STATE ( DURING TRANSMISSION/ COMMUNICATION, ETC.) | 1401 |
| TRANSMITTER INFORMATION | 1402 |
|   SIGNALLING ACCOMMODATION LOCATION | $1402_1$ |
|   VPCI / VCI | $1402_2$ |
|   SUBSCRIBER DATA POINTER | $1402_3$ |
|   TRANSMITTER ADDRESS | $1402_4$ |
| RECEIVER INFORMATION | 1403 |
|   SIGNALLING ACCOMMODATION LOCATION | $1403_1$ |
|   VPCI / VCI | $1403_2$ |
|   SUBSCRIBER DATA POINTER | $1403_3$ |
|   RECEIVER ADDRESS | $1403_4$ |
| TRANSMISSION TIME | 1404 |
| CONNECTION TIME | 1405 |
| RELEASE TIME | 1406 |
| ETC ・・・ | |

FIG. 14

| Bits | | | | | | | | |
|---|---|---|---|---|---|---|---|---|
| 8 | 7 | 6 | 5 | 4 | 3 | 2 | 1 | |
| 0 | 1 | 1 | 1 | 0 | 0 | 0 | 1 | Called party number |
| 0 | 1 | 1 | 1 | 0 | 0 | 0 | 0 | Called party sub-address |
| 0 | 1 | 1 | 1 | 1 | 0 | 0 | 1 | Transit network selection |
| 0 | 1 | 1 | 1 | 1 | 1 | 0 | 0 | Narrow-band high layer compatibility |
| 0 | 1 | 1 | 0 | 0 | 0 | 1 | 0 | Broadband sending complete |
| 0 | 1 | 1 | 0 | 1 | 1 | 1 | 0 | Broadband repeat indicator |
| 0 | 1 | 1 | 0 | 1 | 1 | 0 | 0 | Calling party number |
| 0 | 1 | 1 | 0 | 1 | 1 | 0 | 1 | Calling party sub-address |
| 0 | 1 | 0 | 1 | 1 | 0 | 0 | 0 | ATM adaptation layer parameters |
| 0 | 1 | 0 | 1 | 1 | 0 | 0 | 1 | ATM traffic descriptor |
| 0 | 1 | 0 | 1 | 1 | 0 | 1 | 0 | Connection identifier |
| 0 | 1 | 0 | 1 | 1 | 1 | 0 | 0 | OAM traffic descriptor |
| 0 | 1 | 0 | 1 | 1 | 1 | 0 | 1 | Quality of Service parameter |
| 0 | 1 | 0 | 1 | 1 | 1 | 1 | 0 | Broadband bearer capability |
| 0 | 1 | 0 | 1 | 1 | 1 | 1 | 1 | Broadband Low Layer Information(B-LLI) |
| 0 | 1 | 0 | 1 | 1 | 1 | 0 | 1 | Broadband High Layer Information(B-HLI) |
| 0 | 1 | 0 | 0 | 0 | 0 | 1 | 0 | End-to-end transit delay |
| 0 | 0 | 1 | 0 | 0 | 1 | 1 | 1 | Notification indicator |
| 0 | 0 | 0 | 1 | 1 | 1 | 1 | 0 | Progress indicator |
| 0 | 0 | 0 | 0 | 0 | 1 | 0 | 0 | Narrow-band bearer capability |

FIG. 17

*1 Coding Standard
*2 VP associated signaling
*3 Preferred/Exclusive

VIRTUAL CONNECTION ON ESTABLISHMENT CONTROLLING APPARATUS IN A CELL SWITCHING SYSTEM AND SUBSCRIBER SERVICE PROVIDING METHOD, FOR USE IN A CELL SWITCHING SYSTEM

BACKGROUND OF THE INVENTION

1. Field of the Invention

The present invention relates to a technique for defining subscriber attributes in a cell switching system such as an ATM switching system, etc.

2. Description of the Related Art

In recent years, the organizations such as the ITU-T, ATM Forum, etc. have been standardizing the ATM switching system (Asynchronous Transfer Mode), which is a technique for implementing a wide area ISDN (Integrated Services Digital Network).

A representative of switching connection systems implemented with the ATM switching system is an SVC (Selected Virtual Connection) system. With the SVC system, a subscriber specifies a destination address when he or she desires to make a communication in a similar manner as with a telephone, so that a relay path is selected to dynamically establish a virtual connection, and the virtual connection is released when the communication is terminated. Since a communication path can dynamically be selected depending on a location or state of a party, or a state of a network using the SVC system, the network can be used more efficiently.

With the SVC system, the information called subscriber attributes must be defined for each subscriber, in order to implement switch connection control, accounting control, etc. of each subscriber. The subscriber attributes include a subscriber accommodation location number, maximum connectable virtual connection number, maximum obtainable bandwidth value, connectable service class type, congestion regulation class, presence/absence of a use of a subaddress, presence/absence of a use of information about a lower layer, presence/absence of a transfer of information about a higher layer, presence/absence of an address screening and a screening list, and control information about an accounting information collection, etc.

Conventionally, a user network interface (UNI) used a physical subscriber line such as an optical fiber, as an assignment unit for a subscriber line. Accordingly, the subscriber attributes are defined in physical subscriber line units.

With the ATM switching method, a subscriber can realize a high-speed communication at a maximum transfer rate of several-hundred-M bps due to the advancements in optical fiber technology. Additionally, an entire bandwidth is divided into a plurality of virtual paths (VPs), so that the subscriber can realize a communication in a form in which various types of media information are put into cells and are integrated, with the ATM switching system.

However, since the subscriber attributes are defined only in physical subscriber line units, the flexibility of the ATM switching system cannot be fully applied.

Such a problem is remarkable when a subscriber is accommodated in an ATM switch on a network side via a virtual path multiplexer (VP-MUX), and the attributes of each type of media information included in the subordinates to the VP-MUX are recognized as the same attributes in the ATM switch.

SUMMARY OF THE INVENTION

This invention was developed from the above described background, and aims at implementing a technique for defining subscriber attributes which can fully apply the flexibility of a cell switching system such as an ATM switching system, etc.

The present invention assumes a virtual connection establishment controlling apparatus or a subscriber service providing method, for use in a cell switching system such as the ATM cell switching system, etc., in which a plurality of logical virtual paths which can be identified either in a single or a plurality of subscriber lines is defined; cells of a fixed data length, which are multiplexed in a subscriber line, are assigned to any of the plurality of virtual paths according to the identifiers (VPCIs or VPIs) stored in their headers; and a communication of the cells passing through the virtual path is made.

A first embodiment of the present invention is configured as follows.

An attribute data storing unit stores subscriber attribute data which is defined for each virtual path, the above subscriber attribute data stipulates communication attributes of a subscriber using the virtual path which is defined as a unit.

A virtual connection establishment controlling processor controls communication attributes of a subscriber who uses a virtual path, by referencing the subscriber attribute data corresponding to the virtual path in which the virtual connection is terminated, when the virtual connection is established.

According to the first embodiment of the present invention, communication attributes at the time of establishment of a virtual connection can be defined not for each subscriber line, but for each virtual path in which a virtual connection is terminated. As a result, more precise control for establishing a virtual connection, which can take full advantage of the flexibility of the cell switching system such as the ATM switching system, etc. can be made.

A second embodiment of the present invention is configured as follows.

An attribute data storing unit stores grouped subscriber attribute data which is defined for each path group into which a plurality of virtual paths relating to one or a plurality of subscriber lines are formed, the above grouped subscriber attribute data stipulates communication attributes common to each of virtual connections accommodated in a plurality of virtual paths belonging to the virtual path group, which is defined as a unit.

A virtual connection establishment controlling processor controls communication attributes of a virtual connection by referencing grouped subscriber attribute data corresponding to the virtual path group to which the virtual path accommodating the virtual connection belongs, when the virtual connection is established.

According to the second embodiment of the present invention, communication attributes at the time of establishment of a virtual connection can be defined for a plurality of virtual paths depending on need, so that an efficient control for establishing a virtual connection which can take full advantage of the flexibility of the cell switching system such as the ATM switching system, can be made.

A third embodiment of the present invention is configured as follows.

An attribute data storing unit stores representative subscriber attribute data which is defined for each representative user group into which one or a plurality of subscriber lines are formed, the above representative subscriber attribute data stipulates communication attributes representing a virtual connection of each subscriber using a plurality of virtual paths which belong to one or the plurality of subscriber lines and is defined as a unit.

A virtual connection establishment controlling processor controls communication attributes of a subscriber using a subscriber line by referencing representative subscriber attribute data corresponding to a representative user group to which a subscriber line connected with a subscriber belongs, when a virtual connection is not established, and then establishes the virtual connection by negotiating with the subscriber.

According to the third embodiment of the present invention, even if a subscriber accommodation location number which is, for example, a representative number, is specified as a destination, and it is determined whether or not a reception is accepted without determining a final virtual connection on a receiving side, the communication attributes for that reception can suitably be set.

Furthermore, the capabilities implemented according to the above described first through third embodiments can be mixed and realized according to a fourth or fifth embodiment of the present invention.

In the above described first through third embodiments of the present invention, the communication attributes include, for example, a maximum connectable virtual connection number attribute for defining a maximum number of virtual connections, a maximum obtainable bandwidth value attribute for defining a maximum value of a communication bandwidth, a connectable service class type attribute for defining a type of a characteristic of a cell traffic, a congestion regulation class attribute for defining a priority for determining whether or not a connection of a virtual path is accepted when a cell switching system is in a congested state, a subaddress use attribute for defining whether or not a subaddress is used, an information element attribute for defining whether or not a predetermined information element is passed in a cell switching system for terminals at both ends of a virtual path, an address screening attribute for defining information about whether a connection to a particular party is either accepted or refused, and an accounting attribute for controlling an accounting process, etc.

BRIEF DESCRIPTION OF THE DRAWINGS

One skilled in the art can easily understand additional features and objects of this invention from the description of the preferred embodiments and with reference to the attached drawings, wherein:

FIG. 3 is a schematic diagram showing an operation sequence 2 according to the first preferred embodiment of the present invention;

FIG. 5 is a schematic diagram showing the configuration of a third preferred embodiment according to the present invention;

FIG. 6 is a schematic diagram showing the configuration of a fourth preferred embodiment of the present invention;

FIG. 11 is an explanatory schematic diagram 2 showing specific operations performed by the ATM switch according to the present invention;

FIG. 13 is a schematic diagram explaining a method for managing attribute data in a memory;

FIG. 14 is a schematic diagram explaining the structure of call control data;

FIG. 17 shows data set in an "information element identifier" field included in a SETUP message;

DESCRIPTION OF THE PREFERRED EMBODIMENTS

Figure 1:
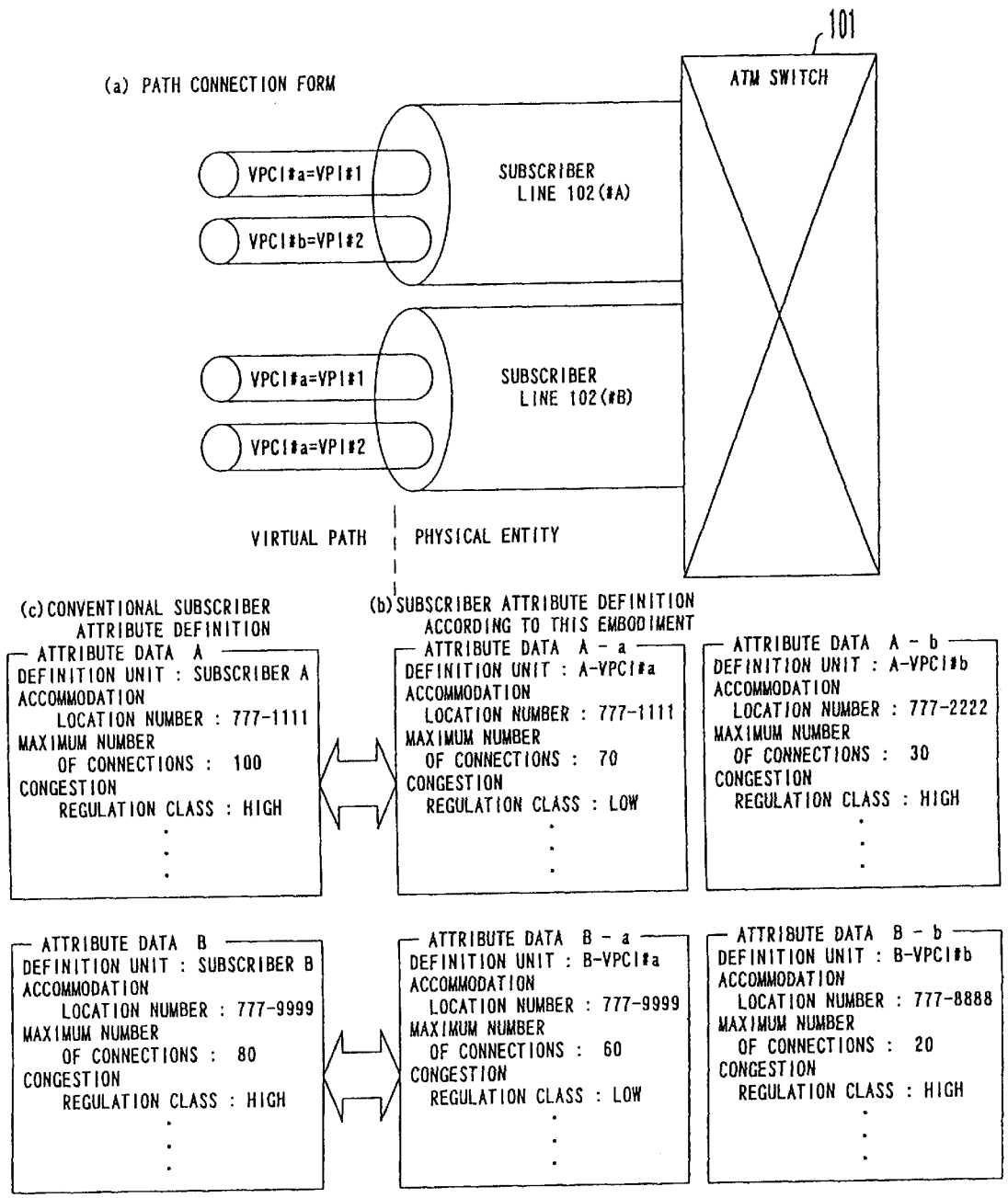
FIG. 1 is a schematic diagram showing the configuration of a first preferred embodiment in comparison with that of a conventional technique.

Provided below are the explanations about the preferred embodiments of the present invention, by referring to the drawings.

Principle Common to Each of the Preferred Embodiments According to the Present Invention Provided first is the explanation about the principle common to each of the preferred embodiments according to the present invention.

A virtual path identifier VPI is used as information for identifying a virtual path (VP) in the ATM switching system. The VPI is determined to be a value unique to each of a plurality of virtual paths in a subscriber line, in order to identify each of the plurality of virtual paths in a single subscriber line which is a single physical line. The VPI is used as header information to be attached to an ATM cell (hereinafter referred to as a cell). It is used alone, or together with a virtual channel identifier (VCI), and identifies each of the plurality of connections in the single subscriber line. At the same time, the VPI is used to control routing of cells in a network.

Also a virtual path connection identifier (VPCI) is used as other information for identifying a virtual path. Currently, a method called proxy signalling is popular as the signalling method for the above described SVC system. With this signalling method, one subscriber performs signalling on behalf of a plurality of subscribers, so that the other subscribers can make communications based on the signalling performed by the representative subscriber by using the SVC, without performing the signalling by themselves. In this case, the representative subscriber and the other subscribers form one group. It is one of the purposes of the VPCI that it is used as the information for identifying each subscriber and one or a plurality of paths belonging to each subscriber in a group which uses the proxy signalling. When a plurality of subscribers exist, a plurality of subscriber lines which are physical lines, which correspond to the plurality of subscribers, may sometimes exist as described above. Therefore, the VPCI may sometimes be determined to be a value unique to each path included in a plurality of subscriber lines corresponding to a plurality of subscribers belonging to a group which uses the proxy signalling, unlike the VPI. Note that a plurality of subscribers may sometimes be accommodated in a subscriber line which is a single physical line.

It is the distinguished feature of these preferred embodiments according to the present invention that subscriber attributes are defined by using the VPCI as the minimum unit.

Provided next are the examples of subscriber attributes which can be defined for each path whose VPCI is used as the minimum unit according to these preferred embodiments.

(1) subscriber accommodation location number: subscriber number information which is assigned to a path whose VPCI is used as the minimum unit, and corresponds to a telephone number in a telephone network.
(2) maximum connectable virtual connection number: the maximum number of virtual connections (VCs) allowed for each path whose VPCI is used as the minimum unit.
(3) maximum obtainable bandwidth value: the maximum value of a communication bandwidth allowed for a path whose VPCI is used as the minimum unit.
(4) connectable service class type: type of a service class of an ATM layer for a path whose VPCI is used as the minimum unit. This type includes a type of a characteristic of a cell traffic (such as a type of a Constant Bit Rate service in a Quality Of Service/type of a Variable Bit Rate service), type of a priority when a cell is discarded, etc.
(5) congestion regulation class: priority for determining whether or not to accept a connection of a path whose VPCI is used as the minimum unit, depending on a congestion level when a switch or a switching network is in a congested state.
(6) presence/absence of a use of a subaddress: indicating whether or not a subaddress is used as specified information of a local terminal or a remote terminal when a path whose VPCI is used as the minimum unit, is connected.
(7) presence/absence of a use of lower layer information: indicating whether or not to make lower layer protocol information pass in a switch, in order for it to be used for a negotiation when a communication is established, for terminals at both ends of a path whose VPCI is used as the minimum unit.
(8) presence/absence of a transfer of upper layer information: Indicating whether or not to pass upper layer protocol information in a switch, in order for it to be used for a negotiation when a communication is established, for terminals at both ends of a path whose VPCI is used as the minimum unit.
(9) presence/absence of an address screening and a screening list: Indicating presence/absence of whether a connection to a particular party is either accepted or refused for a path whose VPCI is used as the minimum unit.
(10) control information about collection of accounting information: various pieces of information which affect collection of accounting information such as information about whether or not to collect accounting information to be provided to an accounting center, when a connection of a path whose VPCI is used as the minimum unit is not completed.

Description of the First Preferred Embodiment According to the Present Invention FIG. 1 is a schematic diagram showing the configuration of a first preferred embodiment according to the present invention, in comparison with that of a conventional technique.

According to this embodiment, a unique VPCI is defined for each of two subscriber lines 102 #A and #B, which are accommodated in an ATM switch 101, as shown in FIG. 1(a). In this case, attribute data indicating subscriber attributes can conventionally be defined for only each of the subscriber lines 102 #A and #B as shown in FIG. 1(c), while the attribute data can be defined for each virtual path whose VPCI is used as the unit according to this embodiment, as shown in FIG. 1(b). Accordingly, it can easily be implemented, for example, to make a different communication form for each of the different subscriber accommodation location numbers belonging to the same subscriber.

Specifically, attribute data A-a is defined by using a VPCI #a of the subscriber line 101 #A (corresponding to a VPI #1 of the subscriber line 102 #A) as the definition unit, while attribute data A-b is defined by using a VPCI #b of the same subscriber line 101 #A (corresponding to a VPI #2 of the subscriber line 102 #A) as the definition unit. Attribute data B-a is defined by using the VPCI #a of the subscriber line 102 #B (corresponding to the VPI #1 of the subscriber line 102 #B) as the definition unit, while attribute data B-b is defined by using the VPCI #b of the same subscriber line 102 #B (corresponding to the VPI #2 of the subscriber line 102 #B) as the definition unit.

Figure 2:
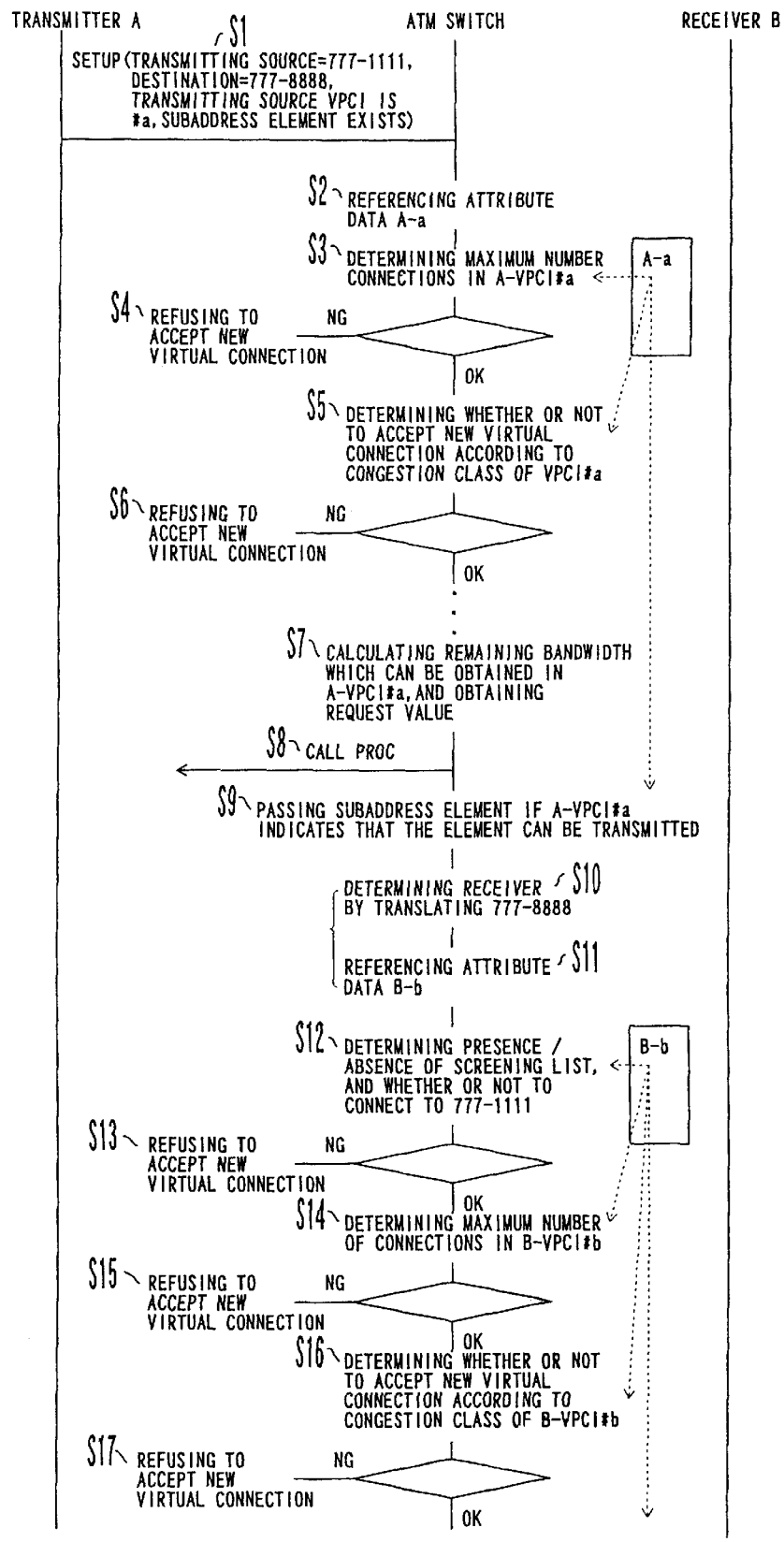
FIG. 2 is a schematic diagram showing an operation sequence 1 according to the first preferred embodiment of the present invention.

FIGS. 2 and 3 are schematic diagrams showing operation sequences according to the first preferred embodiment of the present invention, which is shown in FIG. 1.

A transmitter A transmits a SETUP message whose transmitting source subscriber accommodation location number is "777-1111", destination subscriber accommodation location number is "777-8888", and transmitting source VPCI is #a, and to which a subaddress element is added, to the ATM switch 101 (step S1 in FIG. 2).

On receiving the SETUP message, the ATM switch 101 references the attribute data A-a (refer to FIG. 1(b)) by identifying the subscriber line 102 #A to which the message is transmitted, and by identifying the transmitting source VPCI #a included in the message (step S2 in FIG. 2).

The ATM switch 101 determines whether or not a new virtual connection can be accepted by making a comparison between the number of currently connected virtual connections in the VPCI #a of the subscriber line 102 #A and the maximum number of connectable virtual connections included in the attribute data A-a. (step S3 in FIG. 2).

If the result of this determination is not "OK" ("NG"), the ATM switch 101 refuses to accept the new virtual connection for the above described SETUP message regarding the VPCI #a of the subscriber line 102 #A (step S4 in FIG. 2).

If the result of the determination is "OK", the ATM switch 101 then determines whether or not the new virtual connection can be accepted by making a comparison between the current congested state in the switch and the congestion regulation class included in the attribute data A-a (step S5 in FIG. 2).

If the result of this determination is not "OK" ("NG"), the ATM switch 101 refuses to accept the new virtual connection for the above described SETUP message regarding the VPCI #a of the subscriber line 102 #A (step S6 in FIG. 2).

If the result of the determination is "OK", the ATM switch 101 calculates the remaining bandwidth which can be obtained according to the communication bandwidth that the VPCI #a of the subscriber line 102 #A currently uses, and the maximum bandwidth value which can be obtained included in the attribute data A-a, and obtains the bandwidth value requested by the SETUP message (step S7 in FIG. 2).

The ATM switch 101 transmits a CALL PROCEEDING (CALL PROC) message indicating that the call connection process is continuing, to the subscriber line 102 #A for the transmitter A (step S8 in FIG. 2).

If the attribute data A-a includes the attribute indicating that the subaddress element added to the SETUP message can be transmitted to a receiving side, the ATM switch 101 passes the subaddress element added to the SETUP message to the receiving side (step S9 in FIG. 2).

The ATM switch 101 determines the VPCI #b of the subscriber line 102 #B as a receiver B by parsing the destination subscriber accommodation location number "777-8888" included in the SETUP message (step S10 in FIG. 2).

As a result, the ATM switch 101 references the attribute data B-b (refer to step S11 of FIG. 2 and FIG. 1(b)).

The ATM switch 101 determines whether or not the transmitting source subscriber accommodation location number "777-1111" can be connected to the receiver B, by referencing the presence/absence of an address screening included in the attribute data B-b and the screening list (step S12 in FIG. 2).

If the result of this determination is not "OK" ("NG"), the ATM switch 101 refuses to accept the VPCI #a in the new virtual connection for the above described SETUP message of the subscriber line 102 #A (step S13 in FIG. 2).

The ATM switch 101 determines whether or not the new virtual connection can be accepted by making a comparison between the number of virtual connections which are currently connected in the VPCI #b of the subscriber line 102 #B and the maximum number of connectable virtual connections included in the attribute data B-b (step S14 in FIG. 2).

If the result of this determination is not "OK" ("NG"), the ATM switch 101 refuses to accept the new virtual connection for the VPCI #a in the above described SETUP message of the subscriber line 102 #A (step S15 in FIG. 2).

If the result of this determination is "OK", the ATM switch 101 determines whether or not the new virtual connection can be accepted by making a comparison between the current congested state in the switch and the congestion regulation class included in the attribute data B-b (step S16 in FIG. 2).

If the result of the determination is not "OK", the ATM switch 101 refuses to accept the new virtual connection for the above described SETUP message of the VPCI #a of the subscriber line 102 #A (step S17 in FIG. 2).

If the result of the determination is "OK", the ATM switch 101 secures the bandwidth for the new virtual connection in the VPCI #b of the subscriber line 102 #B according to the communication bandwidth that the VPCI #b of the subscriber line 102 #B currently uses, and the maximum obtainable bandwidth value included in the attribute data B-b (step S18 in FIG. 3).

If the attribute data B-b includes the attribute indicating that the subaddress element can be passed from the transmitting side to the local terminal side, the ATM switch 101 adds the information about the subaddress element passed to the receiving side in step S9 of FIG. 2, to the SETUP message to be transmitted to the receiver B (step S19 in FIG. 3).

The ATM switch 101 transmits the SETUP message including the VPCI #b for the receiver B, to the subscriber line 102 #B for the receiver B (step S20 in FIG. 3).

When receiving the SETUP message, the receiver B determines whether or not a connection can be accepted according to the VPCI #b and other attribute data which are notified by the message. If it is determined that the connection can be accepted, the receiver B returns a CONNECT message to the ATM switch 101 (step S21 in FIG. 3).

When receiving the CONNECT message from the receiver B, the ATM switch 101 transmits the CONNECT message to the subscriber line 102 #A for the transmitter A (step S22 in FIG. 3), and a CONNECT ACKNOWLEDGE message to the subscriber line 102 #B for the receiver B (step S23 in FIG. 3). As a result, a new virtual connection is established between the transmitter A and the receiver B, and both of them enter into a communication state (step S24 in FIG. 3).

For example, if the transmitter A releases the above described virtual connection thereafter, the transmitter A transmits a RELEASE message to the ATM switch 101 (step S25 in FIG. 3).

When receiving the RELEASE message from the transmitter A, the ATM switch 101 transmits the RELEASE message to the subscriber line 102 #B for the receiver B (step S26 in FIG. 3).

On receiving the RELEASE message, the receiver B returns a RELEASE COMPLETE message to the ATM switch 101 (step S27 in FIG. 3).

When receiving the RELEASE COMPLETE message from the receiver B, the ATM switch 101 transmits the RELEASE COMPLETE message to the subscriber line 102 #A for the transmitter A (step S28 in FIG. 3).

As a result, the virtual connection between the transmitter A and the receiver B is released.

The SETUP message directly stores the VPCI according to the above described first preferred embodiment of the present invention. However, the ATM switch 101 may store a table for corresponding a "port number of the subscriber line 102+VPI" to a "VPCI", and determine the VPCI according to the port number of the subscriber line 102 over which the SETUP message is transmitted and the VPI included in the SETUP message.

Figure 4:
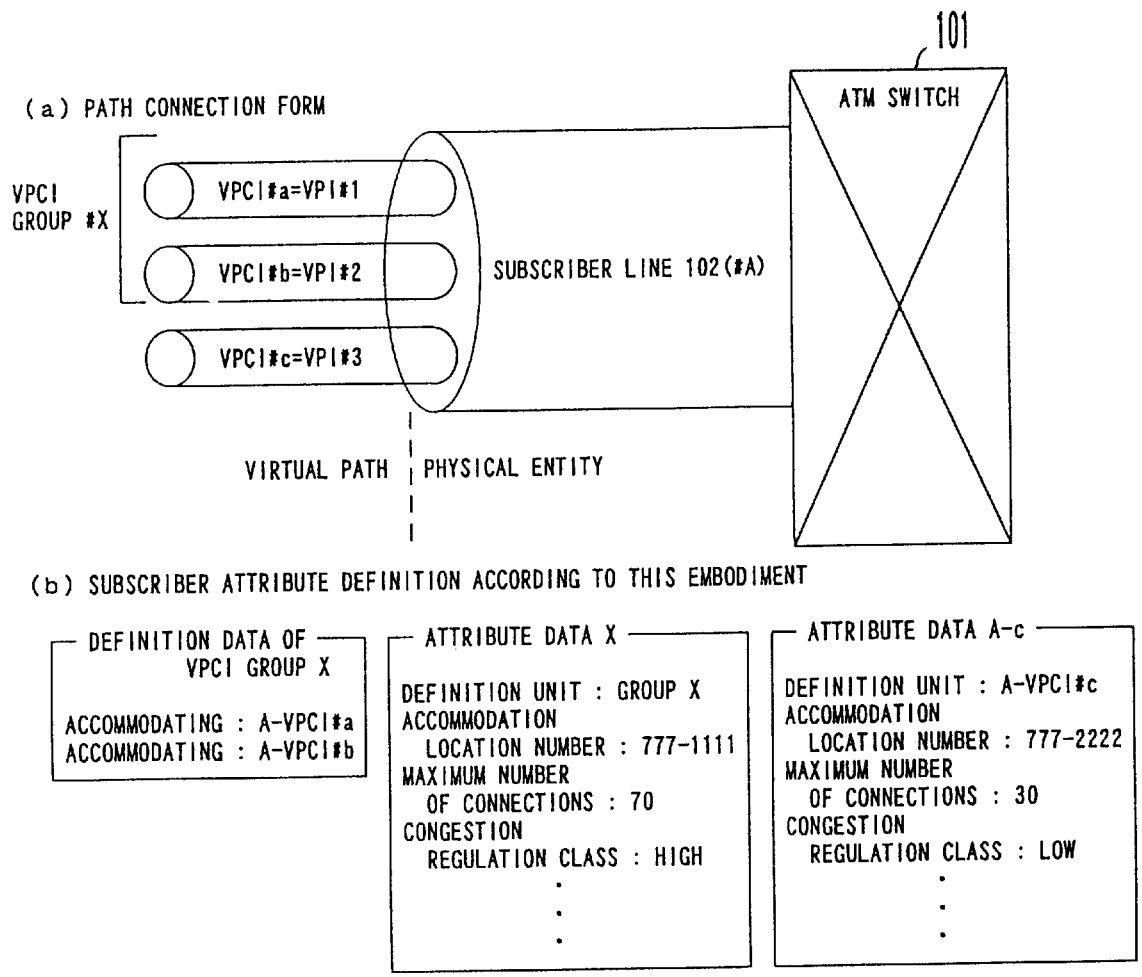
FIG. 4 is a schematic diagram showing the configuration of a second preferred embodiment according to the present invention.

Explanation about the Second Preferred Embodiment According to the Present Invention FIG. 4 is a schematic diagram showing the configuration of the second preferred embodiment according to the present invention.

According to this preferred embodiment, a unique VPCI is defined, for example, for the subscriber line 102 #A, as shown in FIG. 4(a). Additionally, if an arbitrary plural number of VPCIs among the respective VPCIs belonging to the subscriber line 102 #A, for example, the VPCIs #a and #b are formed into a VPCI group X, according to this embodiment. Then, the attribute data A-c is defined for the VPCI #c belonging to the subscriber line 102 #A as the attribute data, as shown in FIG. 4(b). For the VPCIs #a and #b belonging to the subscriber line 102 #A, the common attribute data X is defined as the attribute data of the VPCI group X including these VPCIs. Also the definition data for grouping the VPCIs #a and #b are formed into the VPCI group X, as shown in FIG. 4(b).

Accordingly, when the signalling is performed for the VPCI #c belonging to the subscriber line 102 #A, the subscriber line 102 #A over which the signalling message is transmitted, and the VPCI #c (or the VPI #3, refer to FIG. 4(a)) attached to the signalling message are identified, so that the attribute data A-c is referenced. Furthermore, when the signalling is performed for the VPCI #a or the VPCI #b belonging to the subscriber line 102 #A, the subscriber line 102 #A over which the signalling message is transmitted, and the VPCI #a or the VPCI #b (or the VOI #1 or the VPI

2, refer to FIG. 4(a)) attached to the signalling message are identified, and the definition data (refer to FIG. 4(b)) of the VPCI group X is referenced, so that the attribute data X in the VPCI group X common to the VPCIs #a and #b is referenced.

As described above, a plurality of VPCIs are formed into a VPCI group, and corresponding attribute data is defined, thereby defining the attribute data with more flexibility and more arbitrariness.

Explanation about the Third Embodiment According to the Present Invention

FIG. 5 is a schematic diagram showing the configuration of the third preferred embodiment according to the present invention.

According to this preferred embodiment, a unique VPCI is defined, for example, for each of four paths in the two subscriber lines 102 #A and #B, which are accommodated in the ATM Switch 101, and belong to a group using the proxy signalling, as shown in FIG. 5(a). Furthermore, an arbitrary plural number of VPCIs among the respective VPCIs belonging to the plurality of subscriber lines 102, for example, the VPCI #a belonging to the subscriber line 102 #A and the VPCI #c belonging to the subscriber line 102 #B, are formed into a VPCI group Y, according to this embodiment. In a similar manner as in the second preferred embodiment of the present invention, the attribute data A-d is defined for the VPCI #d belonging to the subscriber line 102 #B as the attribute data, while the common attribute data Y is defined for the VPCIs #a and #b belonging to the subscriber line 102 #A, and the VPCI #c belonging to the subscriber line 102 #B, as the attribute data of the VPCI group Y including these VPCIs, as shown in FIG. 5(b). Additionally, definition data for grouping the VPCIs #a and #b belonging to the subscriber line 102 #A, and the VPCI #c belonging to the subscriber line 102 #B, is defined as the VPCI group "Y", as shown in FIG. 5(b).

Accordingly, when the signalling is performed for the VPCI #c belonging to the subscriber line 102 #B, the subscriber line 102 #B over which the signalling message is transmitted, and the VPCI #d (or the VPI #2, refer to FIG. 5(a)) attached to the signalling message are identified, so that the attribute data B-d is referenced. Furthermore, when the signalling is performed for the VPCI #a or the VPCI #b belonging to the subscriber line 102 #A, and the VPCI #c belonging to the subscriber line 102 #B, the subscriber line 102 #A or #B over which the signalling message is transmitted, and the VPCI #a, VPCI #b, or VPCI #c (or the VPI #1 or the VPI #2, refer to FIG. 5(a)) are identified, and the definition data of the VPCI group Y (refer to FIG. 5(b)) is referenced, so that the attribute data Y of the VPCI group Y, which is common to the VPCI #a, VPCI #b, and the VPCI #c, is referenced.

As described above, a plurality of VPCIs included in a plurality of subscriber lines 102 are formed into a VPCI group, and corresponding attribute data is defined, thereby defining the attribute data with more flexibility and more arbitrariness without any restriction imposed on a subscriber.

Explanation about the Fourth Preferred Embodiment According to the Present Invention FIG. 6 is a schematic diagram showing the configuration of the fourth preferred embodiment according to the present invention.

In a similar manner as in the second preferred embodiment according to the present invention, which is shown in FIG. 4, a unique VPCI is defined, for example, for the subscriber line 102 #A accommodated in the ATM switch 101 as shown in FIG. 6(a), according to this embodiment. Additionally, an arbitrary plural number of VPCIs among the respective VPCIs belonging to the subscriber line 102 #A, for example, the VPCI #a and the VPCI #b, are formed into a VPCI group X in a similar manner as in the second preferred embodiment according to the present invention, which is shown in FIG. 4. The attribute data A-c is then defined for the VPCI #c belonging to the subscriber line 102 #A as the attribute data, while the common attribute data X is defined for the VPCI #a and the VPCI #b belonging to the subscriber line 102A, as the attribute data of the VPCI group X including these VPCIs, as shown in FIG. 6(b). Additionally, the definition data for grouping the VPCI #a and the VPCI #b as a VPCI group X, is defined as shown in FIG. 6(b).

The attribute data A which is a subscriber attribute (representative attribute) representative of the entire subscriber line 102, is defined separately from each attribute data in which a VPCI or a VPCI group is used as a unit, according to the feature of the preferred embodiment.

A method for accessing the attribute data A-c or the attribute data X at the time of normal signalling is similar to that of the second preferred embodiment according to the present invention, which is shown in FIG. 4.

Furthermore, when a transmitting side transmits a SETUP message to the ATM switch 101, a procedure for specifying a subscriber accommodation location number which is a representative number without specifying a subscriber accommodation location number corresponding to a specific VPCI on a receiving side at the time of the transmission, may be used as the procedure for performing signalling in the SVC system. In this case, a VPCI to be finally used is determined according to a CONNECT or CALL PROCEEDING message returned from the receiver to the ATM switch. At this time, the ATM switch 101 requires the subscriber attributes to determine whether or not reception is accepted on the transmitting side upon receipt of the SETUP message from the transmitting side. If it is determined whether or not reception can be accepted without determining a final VPCI as described above, the attribute data A which is the representative attribute is referenced. That is, a subscriber accommodation location number, which is a representative number, is specified as a destination number in a SETUP message when the transmitting side transmits the SETUP message to the ATM switch, so that the ATM switch 101 references the attribute data A which is the representative attribute including the subscriber accommodation location number.

As described above, even if it is determined whether or not reception can be accepted without determining a final VPCI on a receiving side, a subscriber attribute (representative attribute) can suitably be set according to the fourth preferred embodiment of the present invention.

Figure 7:
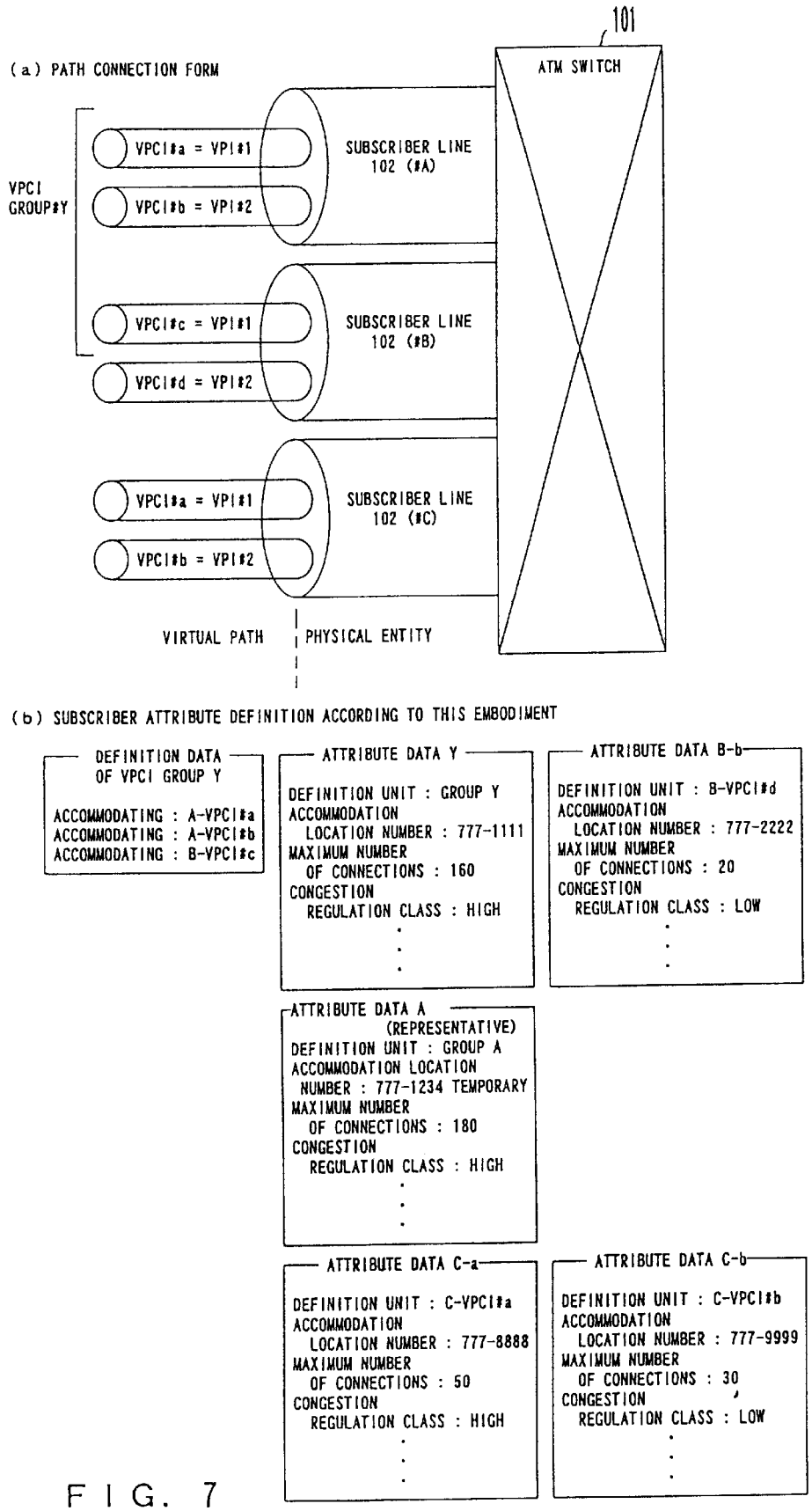
FIG. 7 is a schematic diagram showing the configuration of a fifth preferred embodiment of the present invention.

Explanation about the Fifth Preferred Embodiment According to the Present Invention FIG. 7 is a schematic diagram showing the configuration of the fifth preferred embodiment according to the present invention.

In a similar manner as in the third preferred embodiment according to the present invention, which is shown in FIG. 5, a unique VPCI is defined for each of the four paths included in the two subscriber lines 102 #A and #B which are accommodated in the ATM switch 101, and belong to, for example, a group using the proxy signalling method, while a unique VPCI is defined for the subscriber line 102 #C, as shown in FIG. 7a according to this embodiment. Additionally, an arbitrary plural number of VPCIs among the respective VPCIs belonging to the plurality of subscriber lines 102, for example, the VPCI #a and the VPCI #b which belong to the subscriber line 102 #A, and the VPCI #c which belongs to the subscriber line 102 # B, are formed into a VPCI group Y, in a similar manner as in the third preferred embodiment according to the present invention, which is shown in FIG. 5. Furthermore, as shown in FIG. 7b, common attribute data Y is defined for the VPCI #a and VPCI #b which belong to the subscriber line 102 #A and the VPCI #c which belongs to the subscriber line 102 #B, as the attribute data of the VPCI group Y including these VPCIs, in a similar manner as in the third preferred embodiment according to the present invention, which is shown in FIG. 5. The attribute data A-d is defined for the VPCI #d belonging to the subscriber line 102 #B. The attribute data C-a is defined for the VPCI #a belonging to the subscriber line 102 #C, while the attribute data C-b is defined for the VPCI #b belonging to the subscriber line 102 #C. Still further, also the definition data for grouping the VPCI #a and VPCI #b which belong to the subscriber line 102 #A, and the VPCI #c which belongs to the subscriber line 102 #B, as the VPCI group Y, is defined as shown in FIG. 7b.

Still further, the attribute data A, which is a subscriber attribute (representative attribute) representative of all of the subscriber lines 102 #A and #B, is defined separately for each attribute data in which a VPCI or a VPCI group is used as a unit, in a similar manner as in the fourth preferred embodiment according to the present invention, which is shown in FIG. 6.

A method for accessing the attribute data B-d, C-a, or C-b, or the attribute data Y at the time of normal signalling, is similar to that of the third preferred embodiment according to the present invention, which is shown in FIG. 5.

According to the fifth preferred embodiment of the present invention, which is shown in FIG. 7, the attribute data A which is a representative attribute is referenced to suitably set the subscriber attribute for reception, when it is determined whether or not the reception can be accepted without determining the final VPCI on the receiving side, in a similar manner as in the fourth preferred embodiment according to the present invention, which is shown in FIG. 6.

Figure 8:
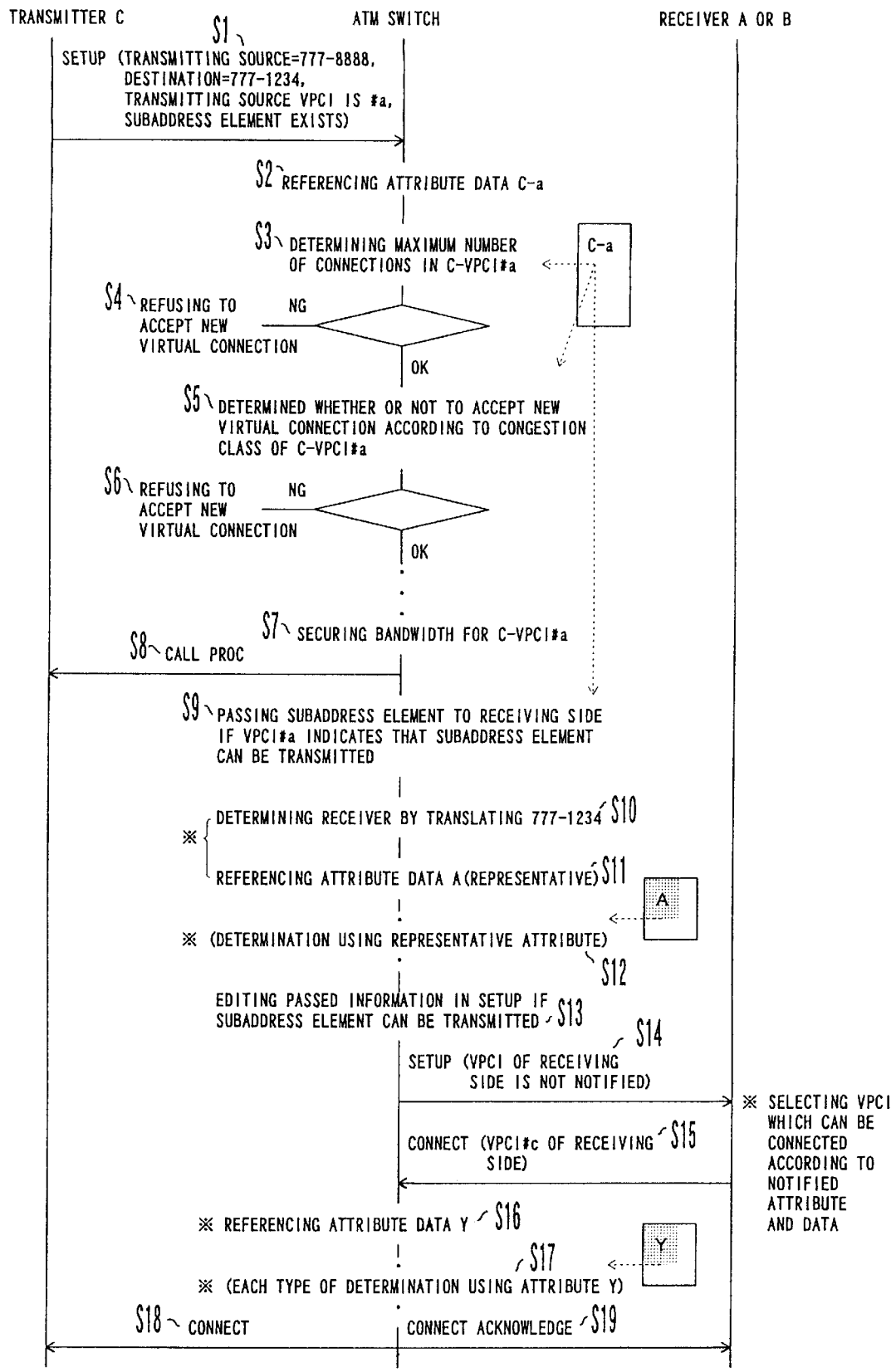
FIG. 8 is a schematic diagram showing an operation sequence according to the fifth preferred embodiment of the present invention.

FIG. 8 is a schematic diagram showing an operation sequence when the above described attribute data which is a representative attribute is referenced, according to the fifth preferred embodiment of the present invention, which is shown in FIG. 7.

First of all, a transmitter C transmits to the ATM switch 101 a SETUP message whose transmitting source subscriber accommodation location number is "777-8888", and representative subscriber accommodation location number at a destination is "777-1234", and to which a subaddress element is added (step S1 in FIG. 8).

When receiving the SETUP message, the ATM switch 101 references the attribute data C-a (refer to FIG. 7b) by identifying the subscriber line 102 #C over which the message is transmitted, and the VPCI #a of the transmitting source included in that message (step S2 in FIG. 8).

The ATM switch 101 determines whether or not to accept a new virtual connection by making a comparison between the number of virtual connections which are currently connected in the VPCI #a in the subscriber line 102 #C, and the maximum connectable virtual connection number included in the attribute data C-a (step S3 in FIG. 8).

If the result of the determination is not "OK" ("NG"), the ATM switch 101 refuses to accept the new virtual connection for the VPCI #a in the above described SETUP message in the subscriber line 102 #C (step S4 in FIG. 8).

If the result of the determination is "OK", the ATM switch 101 determines whether or not to be able to accept the new virtual connection, by making a comparison between the current congested state of the switch and the congestion regulation class included in the attribute data C-a (step S5 in FIG. 8).

If the result of the determination is not "OK" ("NG"), the ATM switch 101 refuses to accept the new virtual connection for the above described SETUP message regarding the VPCI #a in the subscriber line 102 #C (step S6 in FIG. 8).

If the result of the determination is "OK", the ATM switch 101 calculates the remaining bandwidth which can be obtained according to the communication bandwidth that the VPCI #a of the subscriber line 102 #C currently uses, and the maximum obtainable bandwidth value included in the attribute data C-a, and obtains the bandwidth value requested by the SETUP message (step S7 in FIG. 8).

The ATM switch 101 transmits a CALL PROCEEDING (CALL PROC) message indicating that the call connection process is continuing, to the subscriber line 102 #C for the transmitter C (step S8 in FIG. 8).

If the attribute data C-a includes an attribute indicating that the subaddress element added to the SETUP message can be transmitted, the ATM switch 101 passes the subaddress element added to the SETUP message to the receiving side (step S9 in FIG. 8).

The ATM switch 101 determines a receiver by parsing the destination subscriber accommodation location number "777-1234" included in the SETUP message (step S10 in FIG. 8). Since the subscriber accommodation location number "777-1234" is the representative number in this case, the ATM switch 101 selects, for example, the receiver B in the subscriber line 102 #B among the receivers A and B in the subscriber lines 102 #A and #B which belong to the group corresponding to the representative number, according to a predetermined selection algorithm.

At the same time, the ATM switch 101 references the attribute data A which is the representative attribute and includes the above described representative number (step S11 of FIG. 8. refer to FIG. 7b). This operation is a main feature of the present invention.

The ATM switch 101 makes various and necessary determinations by referencing the representative attribute included in the attribute A which is the representative attribute (step S12 in FIG. 8). The determinations include a determination of an address screening, determination of the maximum connectable virtual connection number, determination of a congestion regulation class, and a determination of the maximum obtainable bandwidth value, etc.

If the results of the determinations are "OK", the following process is continued.

If the attribute data A includes the attribute indicating that the subaddress element from the transmitting side can be transmitted to the receiving side, the ATM switch 101 adds the information about the subaddress element passed to the receiving side in step S9 in FIG. 8, to the SETUP message to be transmitted to the receiving side (step S13 in FIG. 8).

The ATM switch 101 transmits the SETUP message to the subscriber line 102 #B for the receiver B (step S14 in FIG. 8). In this case, the VPCI for the receiver B is yet to be set.

On receiving the SETUP message, the receiver B selects a connectable VPCI based on the attribute data notified by the message, for example, the VPCI #c, and returns to the ATM switch 101 the CONNECT message including the selected VPCI #c (step S15 in FIG. 8).

On receiving the CONNECT message including the above described VPCI #c from the receiver B, the ATM switch 101 references the attribute data Y (refer to FIG. 7b) of the VPCI group Y, by identifying the subscriber line 102 #B over which the message is transmitted, and the destination VPCI #c included in that message (step S16 in FIG. 8).

The ATM switch 101 makes various and necessary determinations by referencing the attributes included in the attribute data Y (step S17 in FIG. 8). The determinations include a determination of an address screening, determination of the maximum connectable virtual connection number, determination of a congestion regulation class, and a determination of the maximum obtainable bandwidth value, etc., for the VPCI group Y.

If the results of these determinations are "OK", the ATM switch 101 transmits the CONNECT message to the subscriber line 102 #C for the transmitter C (step S18 in FIG. 8), and transmits the CONNECT ACKNOWLEDGE message to the subscriber line 102 #B for the receiver B (step S19 in FIG. 8). As a result, a new virtual connection is established between the transmitter B and the receiver C, and both of them enter into a communication state.

An operation sequence when the virtual connection is released is similar to that of the first preferred embodiment according to the present invention, which is shown in FIG. 3.

Figure 9:
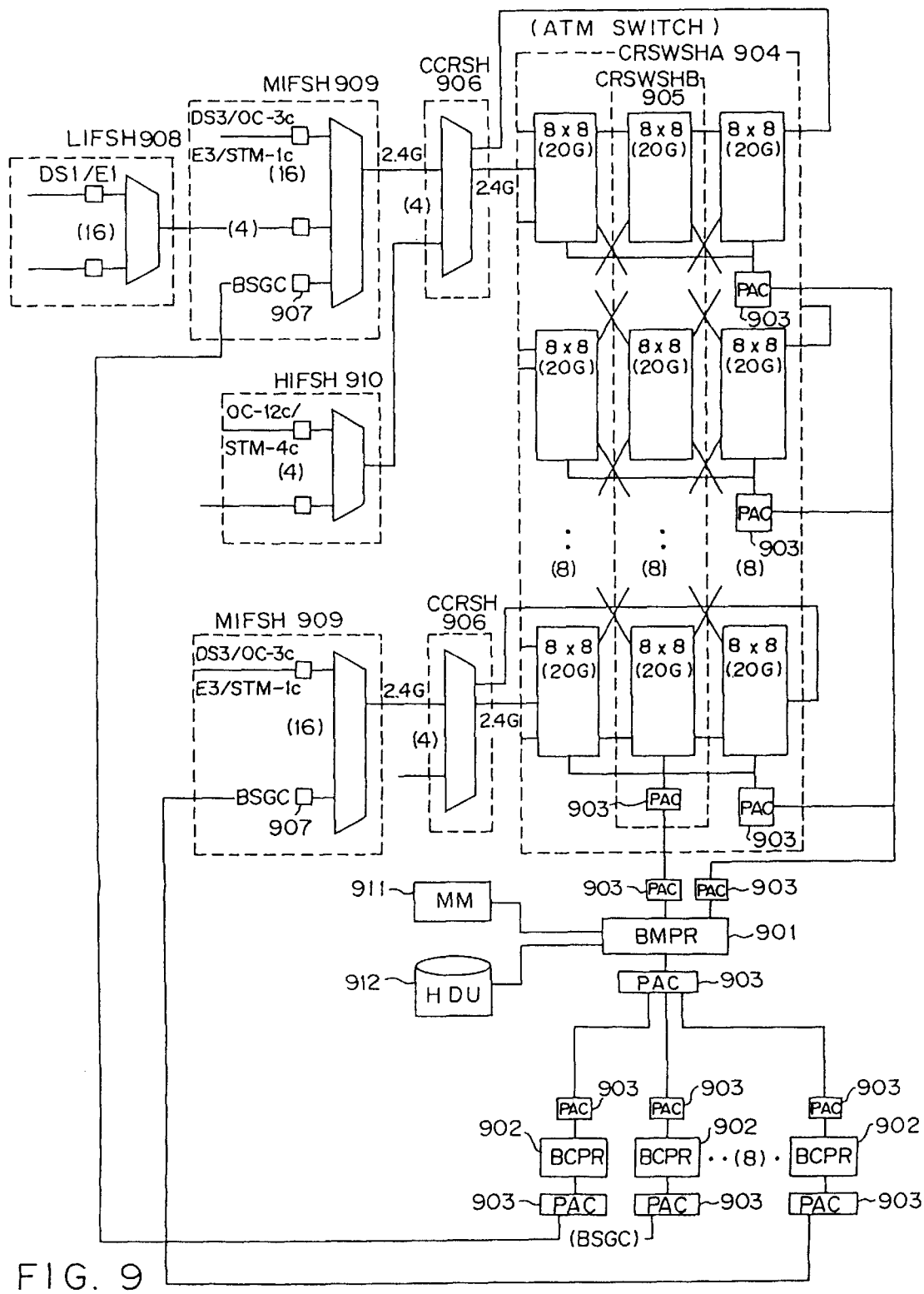
FIG. 9 is a schematic diagram showing the specific configuration of hardware of an ATM switch according to the present invention.

Specific Hardware Configuration of an ATM Switch According to the Present Invention FIG. 9 is a schematic diagram showing the specific configuration of the ATM switch (corresponding to the ATM switch 101 shown in FIG. 1 and FIGS. 4 through 7) for implementing the capabilities according to the first through fifth preferred embodiments of the present invention.

A BMPR (Broadband Main PRocessor) 901 is a main processor for controlling the operations performed in the entire ATM switch, and also for performing the process of a signalling message using the attribute data in the SVC system, which was referred to in the above described first through fifth preferred embodiments of the present invention. The above described attribute data is stored in a main memory (MM) 911 and a hard disk unit (HDU) 912, which are connected to the BMPR 901 (refer to FIG. 13, to be described later). A BCPR (Broadband Call control PRocessor) 902, which is arranged in each line interface, transmits/receives a signalling message for each line interface.

A PAC (Processor Access Controller) 903 is a process or communication controller for respectively connecting the BMPR 901 and the BCPR 902, the BMPR 901 and a CRSWSHA 904/a CRSWSHB 905, which will be described later, and the BCPR 902 and a BSGC 907, which will be described later.

The CRSWSHA (Cell Relay SWitch SHelf A) 904 and the CRSWSHB (Cell Relay SWitch SHelf B) 905 are cell relay switch shelves (communication channels) for actually exchanging ATM cells. The CRSWSHA 904, which is a multi-stage self-routing module, is configured by connecting a plurality of CRSWSHBs 905 which are self-routing modules.

A CCRSH (Cell ConcentRator SHelf) 906 is a cell concentrator.

A DS1, E1, DS3, OC-3c, E3, STM-1c, OC-12c, and an STM-4c are subscriber lines (corresponding to the subscriber line 102 shown in FIG. 1, etc.) or interoffice lines having respective transmission speeds/transmission media.

The BSGC (Broadband SiGnalling Controller) 907 is a signal controller for terminating a signalling message related to a SETUP message, etc.

An LIFSH (Low speed InterFace SHelf) 908 is a low-speed interface for terminating low-speed lines DS1, E1, etc.

An MIFSH (Middle speed InterFace SHelf) 909 is a middle speed interface for terminating middle-speed lines DS3, OC-3c, E3, STM-1c, or lines on a multiplexing side of the LIFSH 908, etc. An HIFSH (High speed InterFace SHelf) 910 is a high-speed interface for terminating high-speed lines such as an OC-12c, STM-4c, etc.

Figure 10:
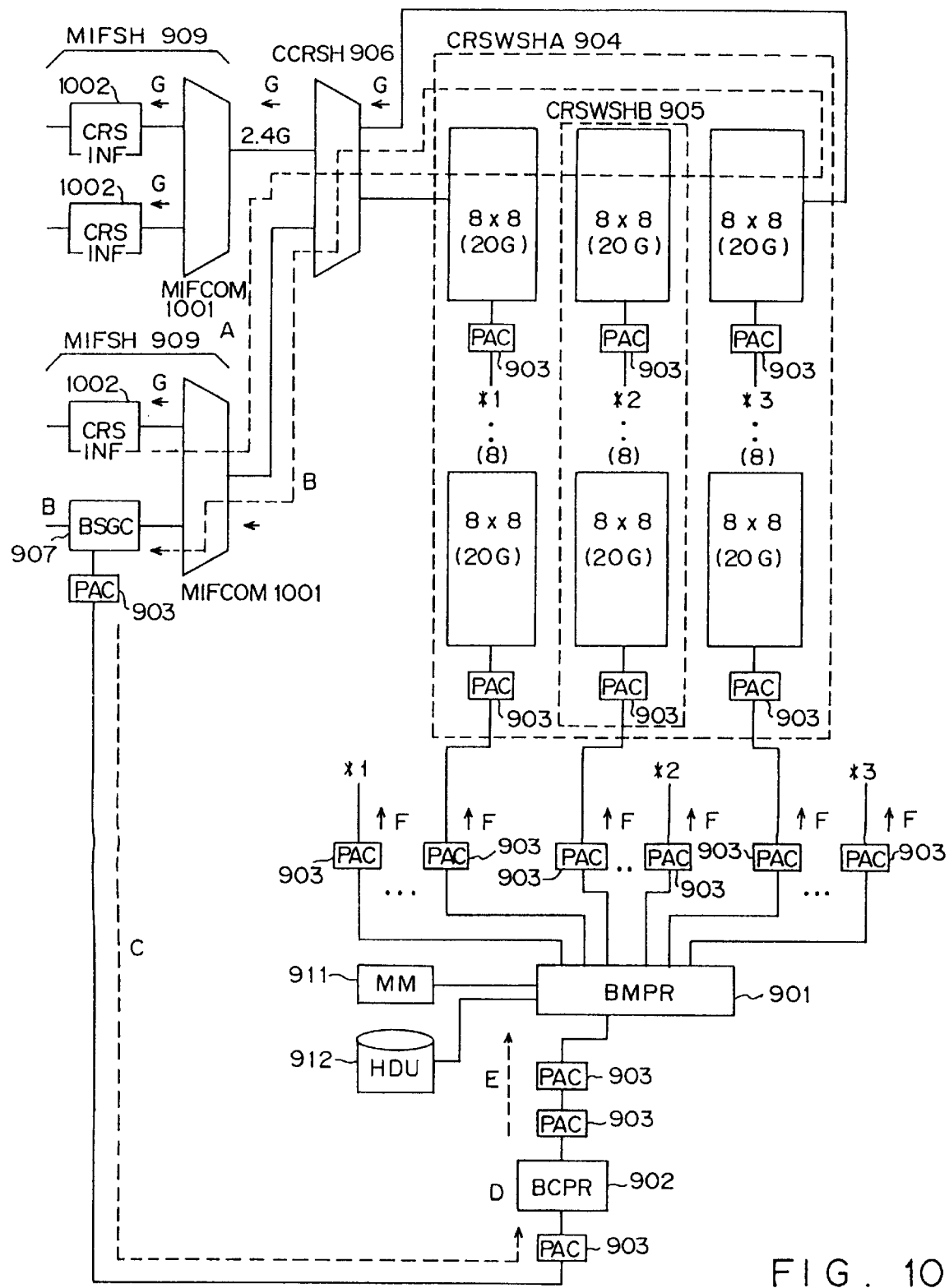
FIG. 10 is an explanatory schematic diagram 1 showing specific operations performed by the ATM switch according to the present invention.

Provided below is the explanation about a relationship between a flow of a signalling message in the SVC system and establishment of a connection, in an ATM switch configured as described above, by referring to the schematic diagrams explaining the operations, which are shown in FIGS. 10 and 11 and corresponds to FIG. 9.

After a signalling message (call control message) such as a SETUP message, etc., which is transmitted over a subscriber line or an interoffice line, is received at a line terminator (CRS INF) 1002 included in the MIFSH 909, etc., it is transmitted to the CRSWSHA 904/CRSWSHB 905 via a multiplexer/demultiplexer (MIFCOM) 1001 included in the MIFSH 909, and the CCRSH 906, etc. (the portion A shown in FIGS. 10 and 11).

The signalling message which passed the CRSWSHA 904/CRSWSHB 905 is terminated by the BSGC 907 via the multiplexer/demultiplexer (MIFCOM) 1001 in the MIFSH 909 (the portion B in FIGS. 10 and 11).

The signalling message terminated by the BSGC 907 is notified to the BCPR (CC) 902 via the PAC 903 (the portion C shown in FIGS. 10 and 11).

The BCPR (CC) 902 performs the above described process of a signalling message using attribute data, which is shown in FIGS. 2, 3, 8, etc., based on the signalling message notified from the BSGC 907 (the portion D shown in FIGS. 10 and 11). The BCPR 902 requests the BMPR 901 to establish a connection via the PACs 903 depending on need (the portion E shown in FIGS. 10 and 11). The BCPR 902 transmits a new signalling message to the transmitter or the receiver from the PAC 903 via the BSGC 907 (the portions H, I, and J shown in FIG. 11).

The BMPR 901 requests the CRSWSHA 904/CRSWSHB 905 to establish a connection via the PACs 903 (the portion F shown in FIGS. 10 and 11).

As a result, a connection is established in the order of the CRSWSHA 904/CRSWSHB 905, CCRSH 906, MIFSH 909 (or the HIFSH 910), and the CR INF 1002 (LIFSH 908) ("G" shown in FIG. 10).

The Relationship Between a Subscriber and a VPCI/VPI

Provided below is the additional explanation about the relationship between a VPCI/VPI and a subscriber defined in each of the above described preferred embodiments according to the present invention.

The subscriber is assigned with a VPCI for identifying a virtual path that the subscriber uses when he or she contracts the SVC service. For example, a subscriber 1 is assigned with VPCI=1, while a subscriber 2 is assigned with VPCI=2, in FIG. 12.

The communication data of the subscribers 1 and 2 are multiplexed into a line interface (OC3c) 1202 by a cross connector 1201 connected to an ATM switch.

In this case, the subscribers 1 and 2 make an actual communication by attaching not a VPCI but a VPI to a header of an ATM cell, and use the same value such as VPI=0 in their respective lines. The cross connector 1201 maps VPI=0 at a port 1 corresponding to the subscriber 1 into VPI=10 in the line interface 1202, and maps VPI=0 at a port 2 corresponding to the subscriber 2 into VPI=20 in the line interface 1202, thereby making a distinction between the communication of the subscriber 1 and that of the subscriber 2.

Figure 12:
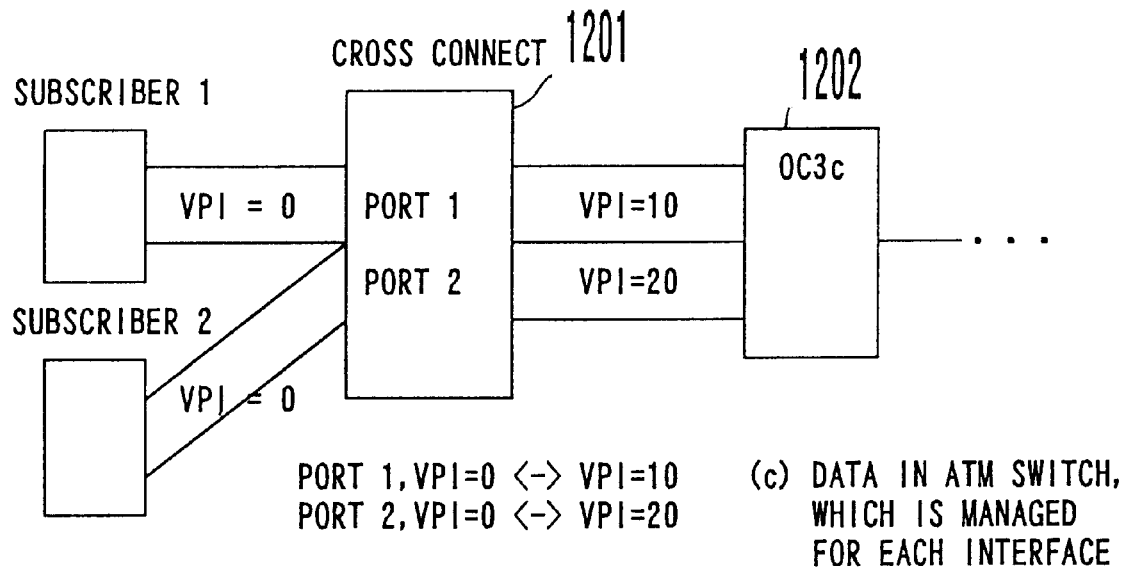
FIG. 12 is a schematic diagram explaining a relationship between VPCIs and subscribers.

Since the virtual paths used by the subscribers 1 and 2 must be distinguished by VPCI as described above, the subscribers 1 and 2 hold respective management data which are shown in FIGS. 12(*a*) and 12(*b*), and indicate a correspondence between the VPI assigned to themselves and the VPI that they use in a communication. Also the line interface 1202 holds management data which is shown in FIG. 12(*c*), and indicates a correspondence between the VPCI and the VPI of each of the subscribers.

Specific Method for Managing Attribute Data and Call Control Data in an ATM Switch Provided next is the explanation about a specific method for managing the attribute data indicating subscriber attributes, and the call control data using the attribute data, which were referred to in each of the above described preferred embodiments.

FIG. 13 is a schematic diagram showing the arrangement of signalling management data 1301, VPCI management data 1302, and subscriber data 1303 in the main memory (MM) 911 (shown in FIG. 9). The subscriber data 1303 and VPCI management data 1302 among these data correspond to the attribute data indicating subscriber attributes, which was referred to in each of the above described embodiments. The VPCI management data 1302 corresponds to the management data shown in FIG. 12c. Note that these data are backed up onto the hard disk unit (HDU) 912 shown in FIG. 9.

The signalling management data 1301 is set in a line interface in which signalling exists (corresponding to 1202 in FIG. 12), and in each virtual connection for the signalling set in the line interface.

If signalling occurs, the signalling management data 1301 in the main memory 911, which corresponds to the signalling, is obtained based on the accommodation location information in the ATM switch in the line interface causing the signalling to occur, and the VPI/VCI values of the virtual connection causing the signalling to occur.

The signalling management data 1301 is structured by a group of signalling attribute parameters such as a signalling speed, timer/counter for retransmission, etc.

Provided first is the explanation about the case in which only one subscriber is accommodated in one line interface (Case A in FIG. 13).

In Case A, the signalling management data 1301 corresponding to the line interface includes a subscriber pointer.

If signalling occurs in Case A, the signalling management data 1301 in the main memory 911, which corresponds to the signalling, is obtained based on the accommodation location information in the ATM switch in the line interface causing the signalling to occur, and the VPI/VCI values of the virtual connection causing the signalling to occur. Then, the subscriber data 1303 in the main memory 911, which is pointed to by the subscriber pointer included in the obtained management data 1301, is directly obtained. With this process, the attribute data referred to in each of the above described embodiments can be obtained.

Simultaneously with the above described control operations, the VPI used in the line interface corresponding to the signalling can be obtained during the signalling by searching for the VPCI information in the VPCI management data 1302 in the main memory 911 which is pointed to by the "pointer to a VP link" included in the above described signalling management data 1301, based on the VPCI specified by the subscriber at the time of the signalling.

Provided next is the explanation about the case in which a plurality of subscribers are accommodated in one line interface (Case B in FIG. 13).

In Case B, the signalling management data 1301 corresponding to the line interface does not include a subscriber pointer.

If signalling occurs in Case B, the signalling management data 1301 in the main memory 911, which corresponds to the signalling, is obtained based on the accommodation location information in the ATM switch in the line interface causing the signalling to occur. Then, the VPI value used in the line interface corresponding to the signalling is obtained during the signalling by searching for the VPCI information in the VPCI management data 1302 in the main memory 911 pointed to by the "pointer to a VP link" included in the signalling management data 1301, based on the VPCI specified by the subscriber at the time of the signalling.

At the same time, the subscriber data 1303 in the main memory 911, which is pointed to by the subscriber pointer included in the VPCI information searched based on the above described VPCI, is obtained. With this process, the attribute data for each VPCI, which was referred to in each of the above described preferred embodiments, can be obtained.

That is, when the signalling management data 1301 is identified in Case B, only the line interface is identified, and a corresponding subscriber among the plurality of subscribers belonging to the line interface, is yet to be identified. The subscriber data 1301 which is the attribute data corresponding to the VPCI is not identified until the VPCI information in the VPCI management data 1302 is searched based on the VPCI specified by the subscriber.

Provided last is the explanation about the case in which identical subscriber data 1303 is assigned to a plurality of VPCIs (Case C in FIG. 13).

The fundamental operations performed in Case C are similar to those in Case B. However, a plurality of VPCI information corresponding to the plurality of VPCIs included in the VPCI management data 1302 include the subscriber pointer referencing the identical subscriber data 1303.

As a result, signalling specifying a different VPCI can use the identical subscriber data 1303. Accordingly, a plurality of VPCIs are formed into a VPCI group, and the subscriber data 1303 which is the attribute data can be defined for that group as referred to in the above described second and third preferred embodiments. In this way, attribute data with more flexibility and arbitrariness can be defined.

In Case C, one subscriber can have a plurality of VPCIs (virtual paths), and the identical subscriber data 1303 can be assigned to the plurality of VPCIs. As a result, effective management for each subscriber can be realized.

FIG. 14 is a schematic diagram showing call control data that an ATM switch manages for each call. The call control data is stored in the main memory (MM) 911 (shown in FIG. 9), and backed up onto the hard disk unit (HDU) 912.

The call control data includes call state information 1401 indicating the current state of a call (during transmission/communication, etc.), transmitter information 1402 indicating the information about a transmitter, receiver information 1403 indicating the information about a receiver, transmission time information 1404, connection time information, release time information, etc.

The transmitter information 1402 and receiver information 1403 are respectively composed of signalling accommodation location information $1402_1$ and $1403_1$, VPCI/VCI $1402_2$ and $1403_2$, subscriber data pointer $1402_3$ and $1403_3$, and a transmitter address or a receiver address $1402_4$ and $1403_4$.

The signalling accommodation location information $1402_1$ is information for identifying the signalling management data 1301 shown in FIG. 13. It is composed of accommodation location information in an ATM switch in a line interface causing signalling of a transmitter or a receiver to occur, and VPI/VCI values of the virtual connection causing the signalling to occur.

The VPCI/VCI $1402_2$ are values specified by a transmitter/receiver.

The subscriber data pointer $1402_3$ is information for identifying the subscriber data 1303 shown in FIG. 13, which is used at the time of signalling of a transmitter/receiver. It is obtained from the signalling management data 1301 (in Case A) or the VPCI management data 1302 (in Case B or C).

The transmitter/receiver address $1402_4$ is a transmitting source subscriber accommodation location number ("777-1111", etc.), or a destination subscriber accommodation location number ("777-8888", etc.), which is specified by a transmitter at the time of signalling.

An ATM switch can manage each call using the above described call control data.

Data Format of a Signalling Message

Figure 15:
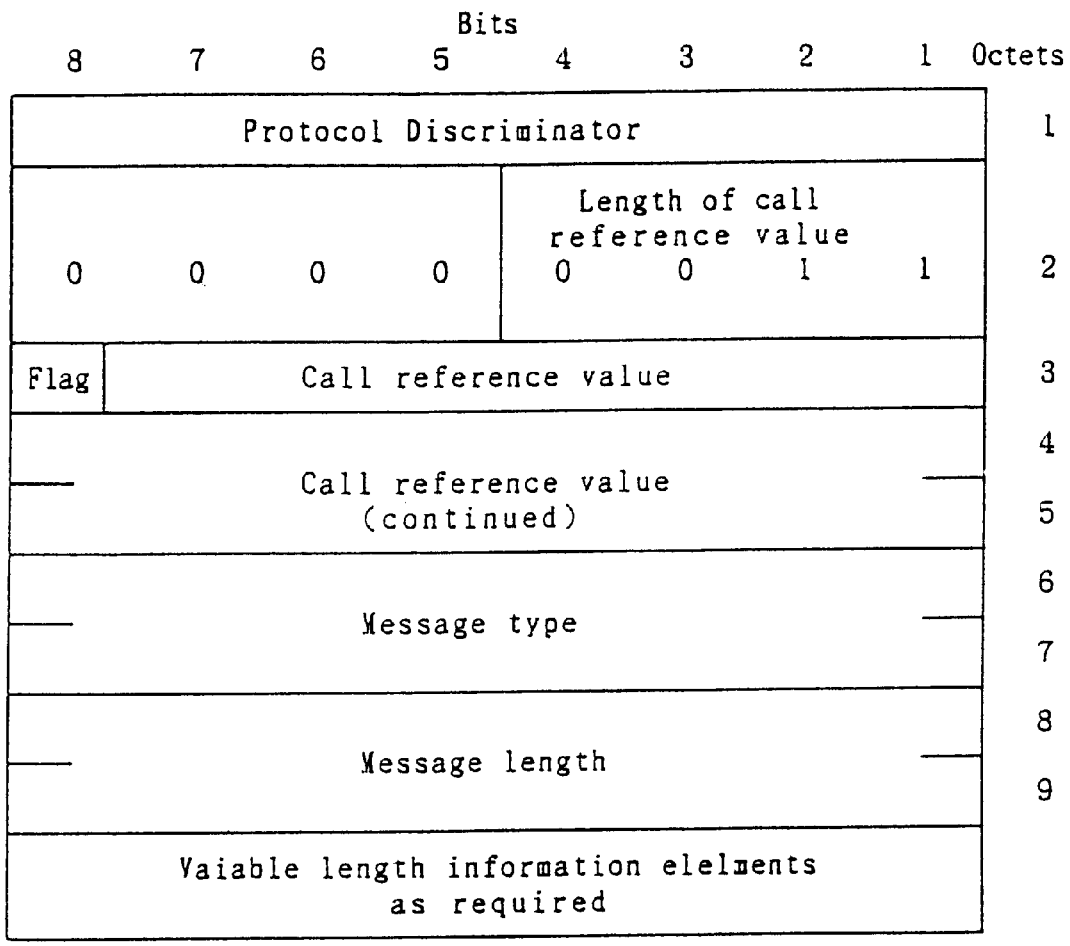
FIG. 15 shows the data format of a signalling message.

FIG. 15 shows the data format of a signalling message used in each of the above described embodiments. The signalling message is composed of the following seven fields.

Protocol discriminator

Length of call reference value

Flag

Call reference value

Message type

Message length

Variable length information elements

The distinction between the above described SETUP and CONNECT messages is made depending on a value set in the "Message type" field.

Figure 16:
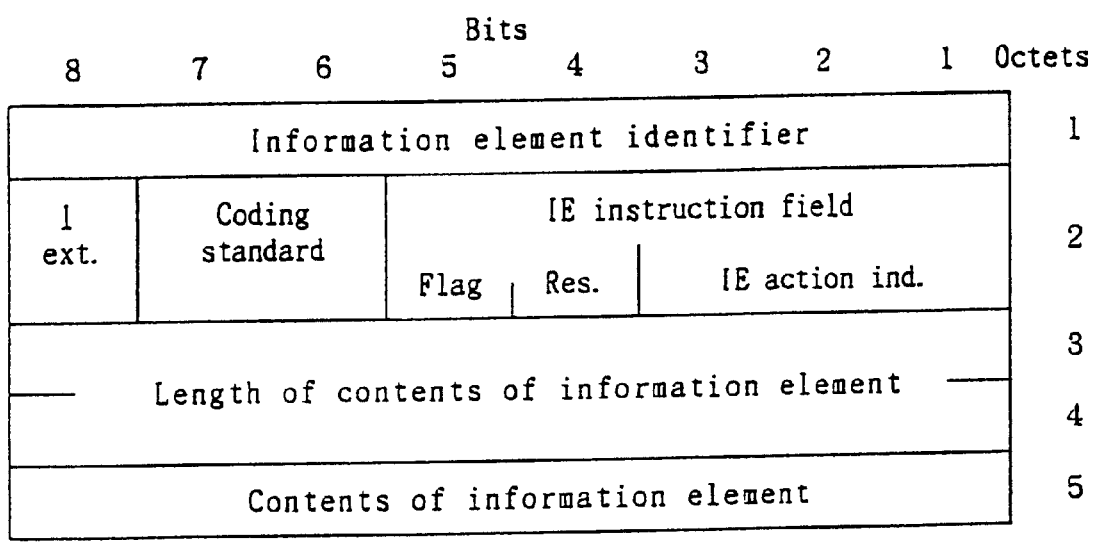
FIG. 16 shows the data format of a "variable length information elements" field.

The specific contents of each message are stored in the "Variable length information elements" field. FIG. 16 shows the data format of this field, which includes the following major fields.

Information element identifier

Coding standard

IE instruction field

Length of contents of information element

Contents of information element

The "Information element identifier" field among these fields stores data indicating the type of specific contents in a message, while the "Contents of information element" field stores the value of the specific contents. FIG. 17 exemplifies the data set in this field included in a SETUP message. The typical data which is set and particularly relates to each of the above described preferred embodiments includes the following types of data.

"Called party number" data specifies a destination subscriber accommodation location number.

"Called party sub-address" and "Calling party sub-address" data specify a sub-address element.

"Calling party number" data specifies transmitting source subscriber accommodation location number.

"Connection identifier" data specifies a VPCI or a VPI, and a VCI.

"Quality of service parameter" data specifies the type of quality of service, which is one type of a connectable service class as a subscriber attribute.

"Broadband bearer capability" data specifies the type of a constant bit rate service/variable bit rate service in the quality of service which is one type of a connectable service class as a subscriber attribute.

"Broadband low layer information" data specifies lower layer information.

"Broadband high layer information" data specifies higher layer information.

Figure 18:
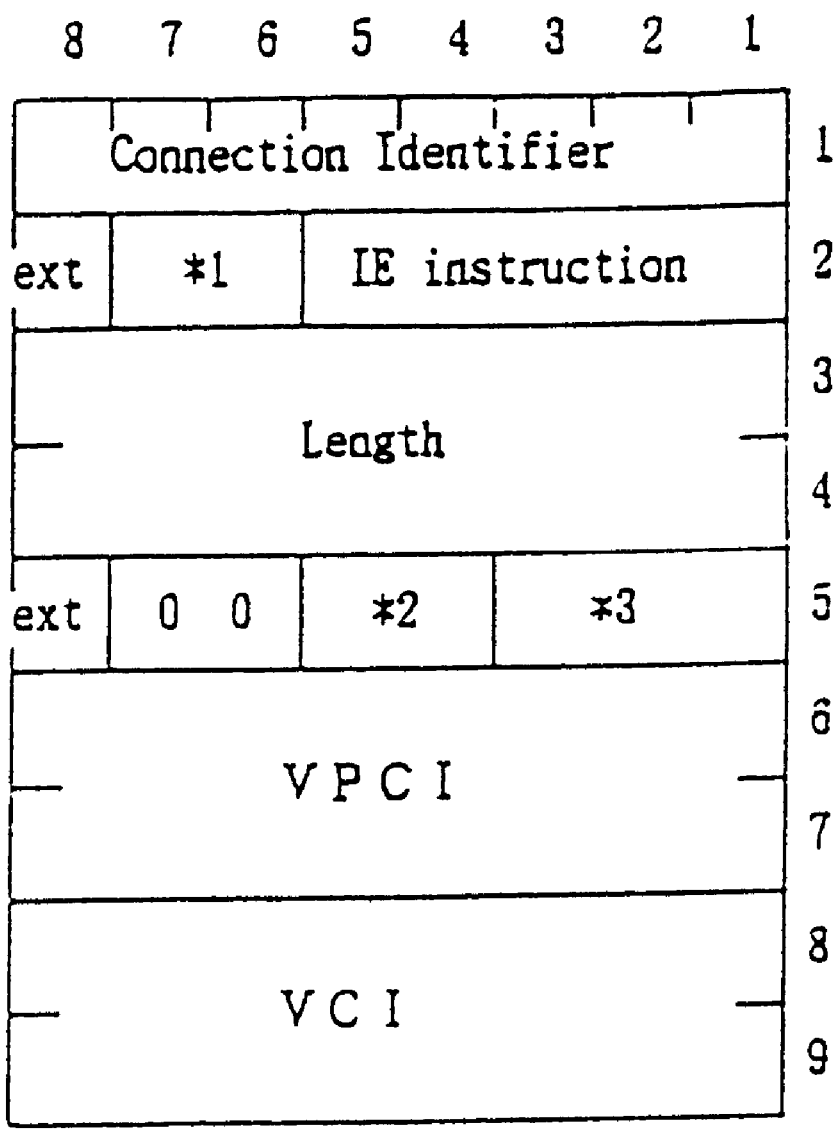
FIG. 18 shows a specific setting of a VPCI in the data format of the signalling message.

FIG. 18 shows the specific contents of the "Variable length information elements" field shown in FIGS. 15 and 16 in the case in which the "Connection identifier" shown in FIG. 17 is set in the "Information element identifier" field shown in FIG. 16.

In this case, a VPCI and a VCI are assigned to the "Contents of information element" field shown in FIG. 16.

Figure 19:
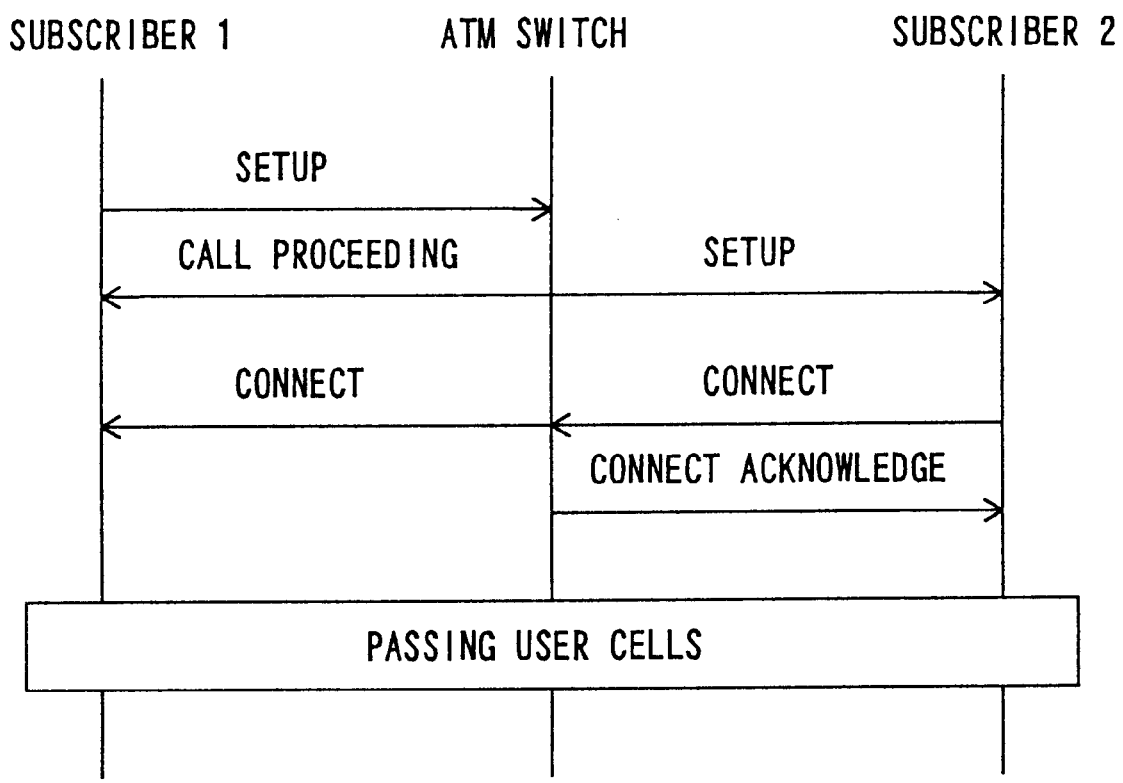
FIG. 19 is a schematic diagram showing a message in which a VPCI is set.

The VPCI and VCI can be set in the SETUP, CALL PROCEEDING (CALL PROC), and CONNECT messages, which are shown in FIG. 19, as described by referring to FIGS. 2, 3, etc.

OTHER PREFERRED EMBODIMENTS

The above described preferred embodiments are implemented by applying the present invention to the SVC switching control system. The present invention, however, is not limited to these embodiments, and can be applied to all of switching control systems which require to reference/set subscriber attributes at the time of establishment of a virtual path. Additionally, the setting unit of a virtual path is not limited to a VPCI. Furthermore, the present invention can be applied to any type of a cell switching system.

What is claimed is:

1. A virtual connection establishment controlling apparatus for use in a cell switching system in which a plurality of virtual paths which can be identified either in one or a plurality of subscriber lines are defined, cells of a fixed data length, which are multiplexed in a subscriber line, are assigned to any of the plurality of virtual paths based on identifiers stored in headers of the cells, and a communication of the cells passing through the virtual path is made, comprising:

attribute data storing unit for storing subscriber attribute data which is defined for each of said virtual path, and stipulates communication attributes of a subscriber using the virtual path; and a virtual connection establishment controlling processor for controlling the communication attributes of the subscriber using the virtual path, by referencing the subscriber attribute data corresponding to the virtual path which accommodates a virtual connection, when the virtual connection is established.

2. The apparatus according to claim 1, wherein the cell switching system is an asynchronous transfer mode cell switching system, and the virtual path is identified based on a virtual path connection identifier.

3. The apparatus according to claim 1, wherein the communication attributes include a subscriber accommodation location number attribute for defining subscriber number information.

4. The apparatus according to claim 1, wherein the communication attributes include a maximum connectable virtual connection number attribute for defining a maximum number of virtual connections.

5. The apparatus according to claim 1, wherein the communication attributes include a maximum obtainable bandwidth value attribute for defining a maximum value of a communication bandwidth.

6. The apparatus according to claim 1, wherein the communication attributes include a connectable service class type attribute for defining a type of a characteristic of cell traffic.

7. The apparatus according to claim 1, wherein the communication attributes include a congestion regulation class attribute for defining a priority for determining whether or not to accept a connection of the virtual path, when the cell switching system is in a congested state.

8. The apparatus according to claim 1, wherein the communication attributes include a subaddress use attribute for defining whether or not to use a subaddress.

9. The apparatus according to claim 1, wherein the communication attributes include an accounting attribute for controlling an accounting process.

10. A virtual connection establishment controlling apparatus for use in a cell switching system in which a plurality of virtual paths which can be identified either in one or a plurality of subscriber lines are defined, cells of a fixed data length, which are multiplexed in a subscriber line, are assigned to any of the plurality of virtual paths based on identifiers stored in headers of the cells, and a communication of the cells passing through the virtual path is made, comprising:

attribute data storing unit for storing subscriber attribute data which is defined for each of said virtual path, and stipulates communication attributes of a subscriber using the virtual path;

a virtual connection establishment controlling processor for controlling the communication attributes of the subscriber using the virtual path, by referencing the subscriber attribute data corresponding to the virtual path which accommodates a virtual connection, when the virtual connection is established;

wherein:

said attribute data storing unit further stores grouped subscriber attribute data which is defined for each virtual path group into which a plurality of virtual paths relating to one or the plurality of subscriber lines are formed, and stipulates communication attributes common to each of the virtual connections accommodated in the plurality of virtual paths belonging to the virtual path group; and said virtual connection establishment controlling processor controls communication attributes of the virtual connection by referencing the subscriber attribute data corresponding to the virtual path, at the time of establishment of the virtual connection if the virtual path accommodating the virtual connection does not belong to any of the virtual path group, and controls the communication attributes of the virtual connection by referencing the grouped subscriber attribute data corresponding to the virtual path group to which the virtual path accommodating the virtual connection belongs, at the time of establishment of the virtual connection if the virtual path accommodating the virtual connection belongs to one of the virtual path group.

11. A virtual connection establishment controlling apparatus for use in a cell switching system in which a plurality of virtual paths which can be identified either in one or a plurality of subscriber lines are defined, cells of a fixed data length, which are multiplexed in a subscriber line, are assigned to any of the plurality of virtual paths based on identifiers stored in headers of the cells, and a communication of the cells passing through the virtual path is made, comprising:

attribute data storing unit for storing subscriber attribute data which is defined for each of said virtual path, and stipulates communication attributes of a subscriber using the virtual path;

a virtual connection establishment controlling processor for controlling the communication attributes of the subscriber using the virtual path, by referencing the subscriber attribute data corresponding to the virtual path which accommodates a virtual connection, when the virtual connection is established;

wherein:

said attribute data storing unit further stores representative subscriber attribute data which is defined for each representative use group into which one or the plurality of subscriber lines are formed, and stipulates the communication attributes representing a virtual connection of each subscriber using the plurality of virtual paths which belong to one or the plurality of subscriber lines; and said virtual connection establishment controlling processor controls the communication attributes of the subscriber using the subscriber line by referencing the representative subscriber attribute data corresponding to the representative use group to which the subscriber line connected to the subscriber attempting to establish the virtual connection belongs, when the virtual connection is not established, and then establishes the virtual connection by negotiating with the subscriber.

12. A virtual connection establishment controlling apparatus for use in a cell switching system in which a plurality of virtual paths which can be identified either in one or a plurality of subscriber lines are defined, cells of a fixed data length, which are multiplexed in a subscriber line, are assigned to any of the plurality of virtual paths based on identifiers stored in headers of the cells, and a communication of the cells passing through the virtual path is made, comprising:

attribute data storing unit for storing subscriber attribute data which is defined for each of said virtual path, and stipulates communication attributes of a subscriber using the virtual path; and a virtual connection establishment controlling processor for controlling the communication attributes of the subscriber using the virtual path, by referencing the subscriber attribute data corresponding to the virtual path which accommodates a virtual connection, when the virtual connection is established;

wherein the communication attributes include an information element attribute for defining whether or not to make predetermined information elements pass in the cell switching system for terminals at both ends of the virtual path.

13. A virtual connection establishment controlling apparatus for use in a cell switching system in which a plurality of virtual paths which can be identified either in one or a plurality of subscriber lines are defined, cells of a fixed data length, which are multiplexed in a subscriber line, are assigned to any of the plurality of virtual paths based on identifiers stored in headers of the cells, and a communication of the cells passing through the virtual path is made, comprising:

attribute data storing unit for storing subscriber attribute data which is defined for each of said virtual path, and stipulates communication attributes of a subscriber using the virtual path; and a virtual connection establishment controlling processor for controlling the communication attributes of the subscriber using the virtual path, by referencing the subscriber attribute data corresponding to the virtual path which accommodates a virtual connection, when the virtual connection is established;

wherein the communication attributes include an address screening attribute for defining information about whether a connection to a particular party is either accepted or refused.

14. A virtual connection establishment controlling apparatus for use in a cell switching system in which a plurality of virtual paths which can be identified either in one or a plurality of subscriber lines are defined, cells of a fixed data length, which are multiplexed in a subscriber line, are assigned to any of the plurality of virtual paths based on identifiers stored in headers of the cells, and a communication of the cells passing through the virtual path is made, comprising:

attribute data storing unit for storing grouped subscriber attribute data which is defined for each virtual path group into which a plurality of virtual paths relating to one or the plurality of subscriber lines are formed, and stipulates communication attributes common to each of virtual connections accommodated in the plurality of virtual paths belonging to the virtual path group; and a virtual connection establishment controlling processor for controlling the communication attributes of the virtual connection by referencing the grouped subscriber attribute data corresponding to the virtual path group to which the virtual path accommodating the virtual connection belongs, at the time of establishment of the virtual connection.

15. The apparatus according to claim 14, said attribute data storing unit further stores representative subscriber attribute data which is defined for each representative use group into which one or the plurality of subscriber lines are formed, and stipulates the communication attributes of each of the virtual connections accommodated in the plurality of virtual paths which belong to one or the plurality of subscriber lines; and said virtual connection establishment controlling processor controls the communication attributes of the subscriber using the subscriber line by referencing the representative subscriber attribute data corresponding to the representative use group to which the subscriber line connected to the subscriber attempting to establish the virtual connection belong, if the virtual connection is not established, and then establishes the virtual connection by negotiating with the subscriber.

16. The apparatus according to claim 14, wherein the cell switching system is an asynchronous transfer mode cell switching system, and the virtual path is identified by a virtual path connection identifier.

17. The apparatus according to claim 14, wherein the communication attributes include a subscriber accommodation location number attribute for defining subscriber number information.

18. The apparatus according to claim 14, wherein the communication attributes include a maximum connectable virtual connection number attribute for defining a maximum number of virtual connections.

19. The apparatus according to claim 14, wherein the communication attributes include a maximum obtainable bandwidth value attribute for defining a maximum value of a communication bandwidth.

20. The apparatus according to claim 14, wherein the communication attributes include a connectable service class type attribute for defining a type of a characteristic of cell traffic.

21. The apparatus according to claim 14, wherein the communication attributes include a congestion regulation class attribute for defining a priority for determining whether or not to accept a connection of the virtual path, when the cell switching system is in a congested state.

22. The apparatus according to claim 14, wherein the communication attributes include a subaddress use attribute for defining whether or not to use a subaddress.

23. The apparatus according to claim 14, wherein the communication attributes include an information element attribute for defining whether or not to make predetermined information elements pass in the cell switching system for terminals at both ends of the virtual path.

24. The apparatus according to claim 14, wherein the communication attributes include an address screening attribute for defining information about whether a connection to a particular party is either accepted or refused.

25. The apparatus according to claim 14, wherein the communication attributes include an accounting attribute for controlling an accounting process.

26. A virtual connection establishment controlling apparatus for use in a cell switching system in which a plurality of virtual paths which can be identified either in one or a plurality of subscriber lines are defined, cells of a fixed data length, which are multiplexed in a subscriber line, are assigned to any of the plurality of virtual paths based on identifiers stored in headers of the cells, and a communication of the cells passing through the virtual path is made, comprising:

attribute data storing unit for storing representative subscriber attribute data which is defined for each representative use group into which one or the plurality of subscriber lines are formed, and stipulates the communication attributes representing a virtual connection of each subscriber using the plurality of virtual paths which belong to one or the plurality of subscriber lines; and a virtual connection establishment controlling processor for controlling the communication attributes of the subscriber using the subscriber line by referencing the representative subscriber attribute data corresponding to the representative use group to which the subscriber line connected to the subscriber attempting to establish the virtual connection belongs, when the virtual connection is not established, and then establishes the virtual connection by negotiating with the subscriber.

27. The apparatus according to claim 26, wherein the cell switching system is an asynchronous transfer mode cell switching system, and the virtual path is identified by a virtual path connection identifier.

28. The apparatus according to claim 26, wherein the communication attributes include a subscriber accommodation location number attribute for defining subscriber number information.

29. The apparatus according to claim 26, wherein the communication attributes include a maximum connectable virtual connection number attribute for defining a maximum number of virtual connections.

30. The apparatus according to claim 26, wherein the communication attributes include a maximum obtainable bandwidth value attribute for defining a maximum value of a communication bandwidth.

31. The apparatus according to claim 26, wherein the communication attributes include a connectable service class type attribute for defining a type of a characteristic of cell traffic.

32. The apparatus according to claim 26, wherein the communication attributes include a congestion regulation class attribute for defining a priority for determining whether or not to accept a connection of the virtual path, when the cell switching system is in a congested state.

33. The apparatus according to claim 26, wherein the communication attributes include a subaddress use attribute for defining whether or not to use a subaddress.

34. The apparatus according to claim 26, wherein the communication attributes include an information element attribute for defining whether or not to make predetermined information elements pass in the cell switching system for terminals at both ends of the virtual path.

35. The apparatus according to claim 26, wherein the communication attributes include an address screening attribute for defining information about whether a connection to a particular party is either accepted or refused.

36. The apparatus according to claim 26, wherein the communication attributes include an accounting attribute for controlling an accounting process.

37. A subscriber service providing method for use in a cell switching system in which a plurality of virtual paths which can be identified either in one or a plurality of subscriber lines are defined, cells of a fixed data length, which are multiplexed in a subscriber line, are assigned to any of the plurality of virtual paths based on identifiers stored in headers of the cells, and a communication of the cells passing through the virtual path is made, comprising the steps of:

storing subscriber attribute data which is defined for each of said virtual path, and stipulates communication attributes of a subscriber using the virtual path; and controlling the communication attributes of the subscriber using the virtual path, by referencing the subscriber attribute data corresponding to the virtual path which accommodates a virtual connection, when the virtual connection is established.

38. A subscriber service providing method for use in a cell switching system in which a plurality of virtual paths which can be identified either in one or a plurality of subscriber lines are defined, cells of a fixed data length, which are multiplexed in a subscriber line, are assigned to any of the plurality of virtual paths based on identifiers stored in headers of the cells, and a communication of the cells passing through the virtual path is made, comprising the steps of:

forming a plurality of virtual paths relating to one or the plurality of subscriber lines into a virtual path group;

storing grouped subscriber attribute data which is defined for each virtual path group, and stipulates communication attributes common to each of virtual connections accommodated in the plurality of virtual paths belonging to the virtual path group; and controlling the communication attributes of the virtual connection by referencing the grouped subscriber attribute data corresponding to the virtual path group to which the virtual path accommodating the virtual connection belongs, when the virtual connection is established.

39. A subscriber service providing method for use in a cell switching system in which a plurality of virtual paths which can be identified either in one or a plurality of subscriber lines are defined, cells of a fixed data length, which are multiplexed in a subscriber line, are assigned to any of the plurality of virtual paths based on identifiers stored in headers of the cells, and a communication of the cells passing through the virtual path is made, comprising the steps of:

forming one or the plurality of subscriber lines into a representative use group;

storing representative subscriber attribute data which is defined for each representative use group, and stipulates the communication attributes representing a virtual connection of each subscriber using the plurality of virtual paths which belong to one or the plurality of subscriber lines; and controlling the communication attributes of the subscriber using the subscriber line by referencing the representative subscriber attribute data corresponding to the representative use group to which the subscriber line connected to the subscriber attempting to establish the virtual connection belongs, when the virtual connection is not established; and establishing the virtual connection by negotiating with the subscriber.

* * * * *